Aug. 9, 1966 W. F. POWELL, JR 3,265,930
CURRENT LEVEL SWITCHING APPARATUS FOR OPERATING
ELECTRIC DISCHARGE LAMPS
Filed May 3, 1962 9 Sheets-Sheet 1

INVENTOR.
WALTER F. POWELL, JR.
BY Henry J. Maraniak
ATTORNEY

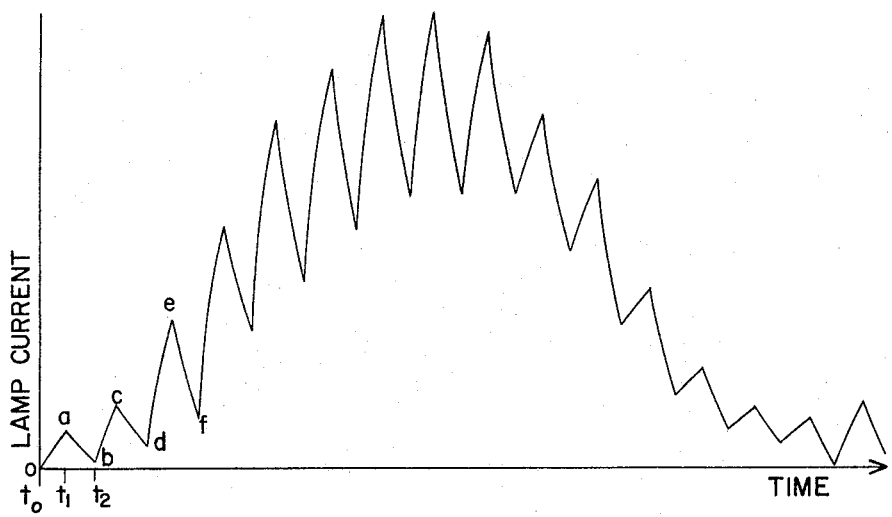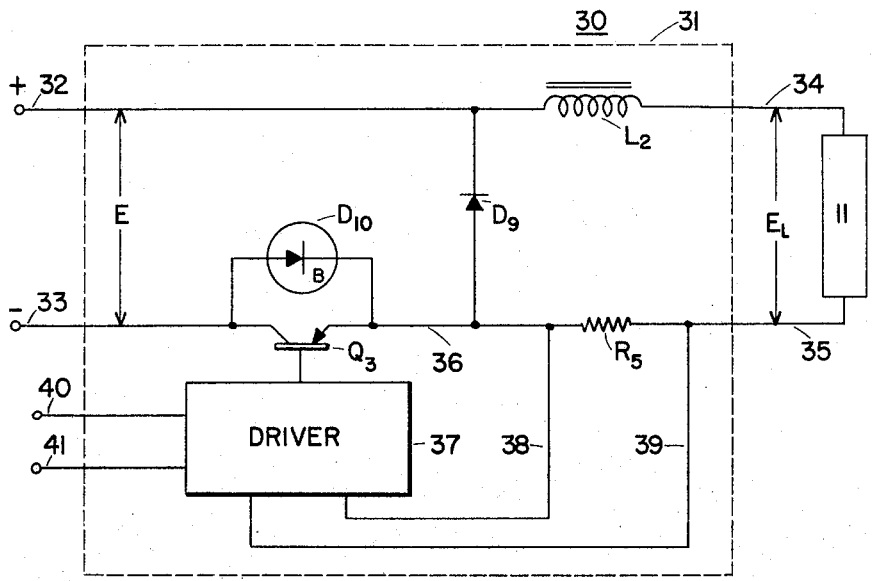

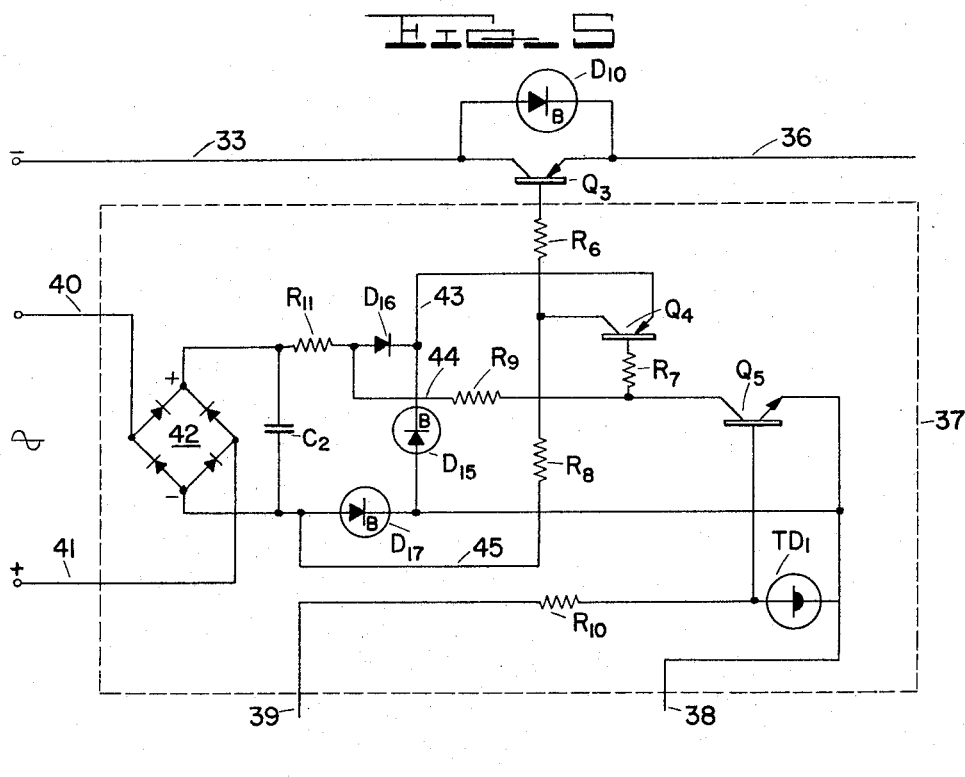
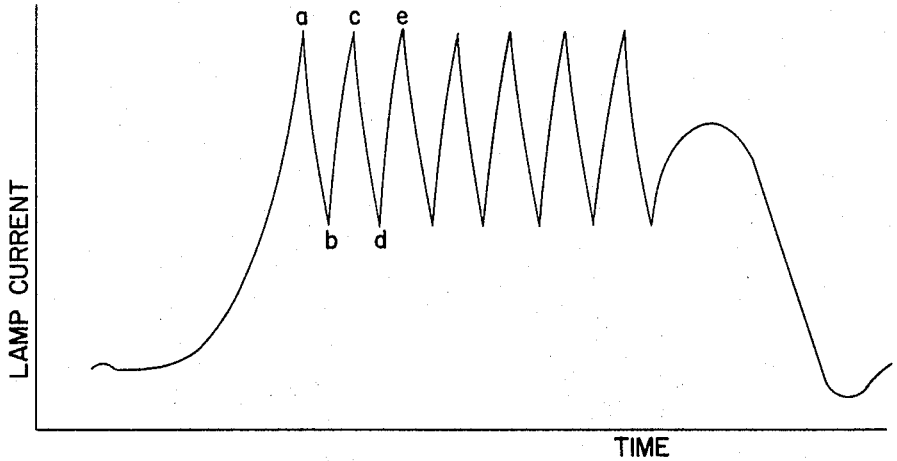

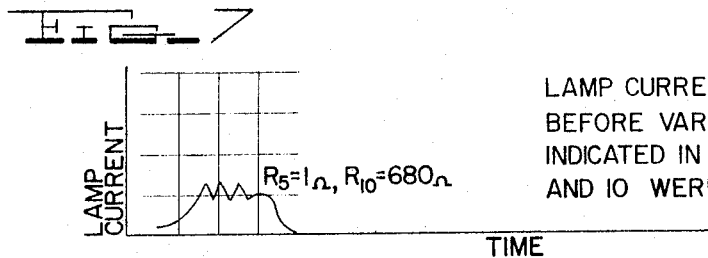
FIG. 7 — LAMP CURRENT WAVEFORM BEFORE VARIATIONS INDICATED IN FIGS. 8, 9, AND 10 WERE MADE
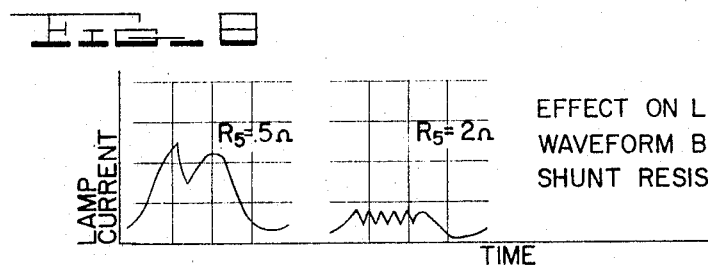
FIG. 8 — EFFECT ON LAMP CURRENT WAVEFORM BY VARYING SHUNT RESISTOR $R_5$
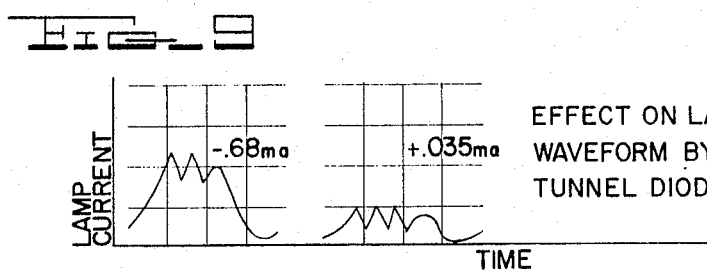
FIG. 9 — EFFECT ON LAMP CURRENT WAVEFORM BY VARYING TUNNEL DIODE BIAS
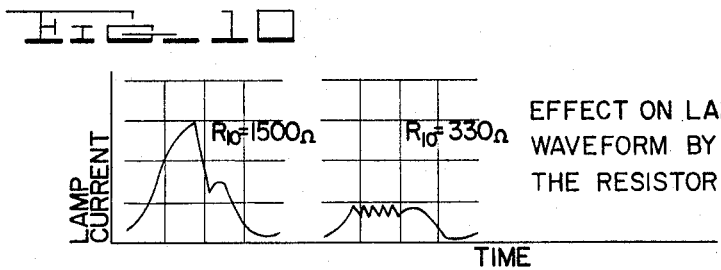
FIG. 10 — EFFECT ON LAMP CURRENT WAVEFORM BY VARYING THE RESISTOR $R_{10}$
INVENTOR.
WALTER F. POWELL, JR.
BY Henry J. Marciniak
ATTORNEY

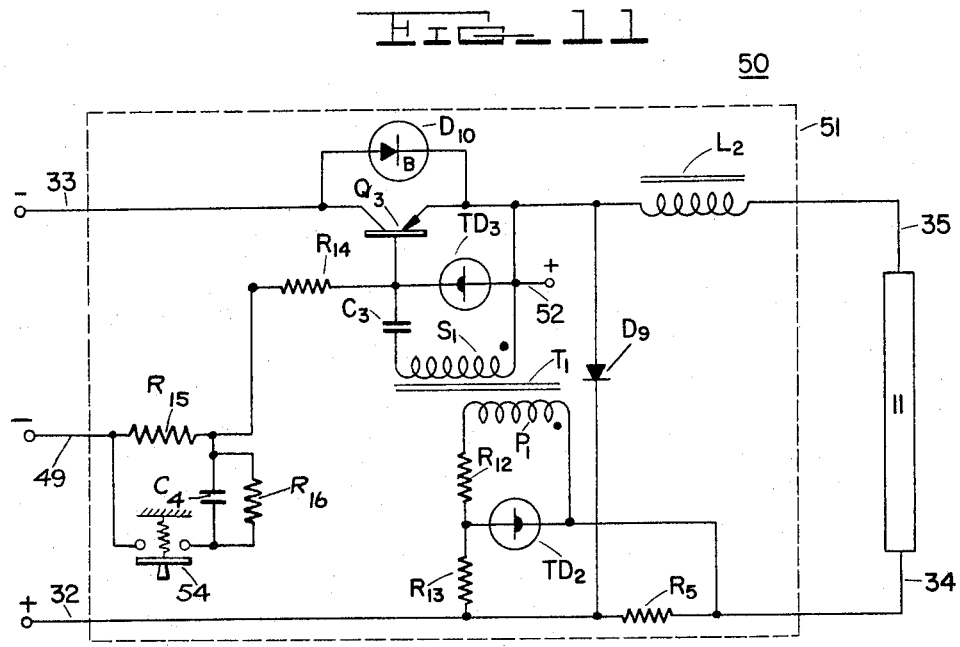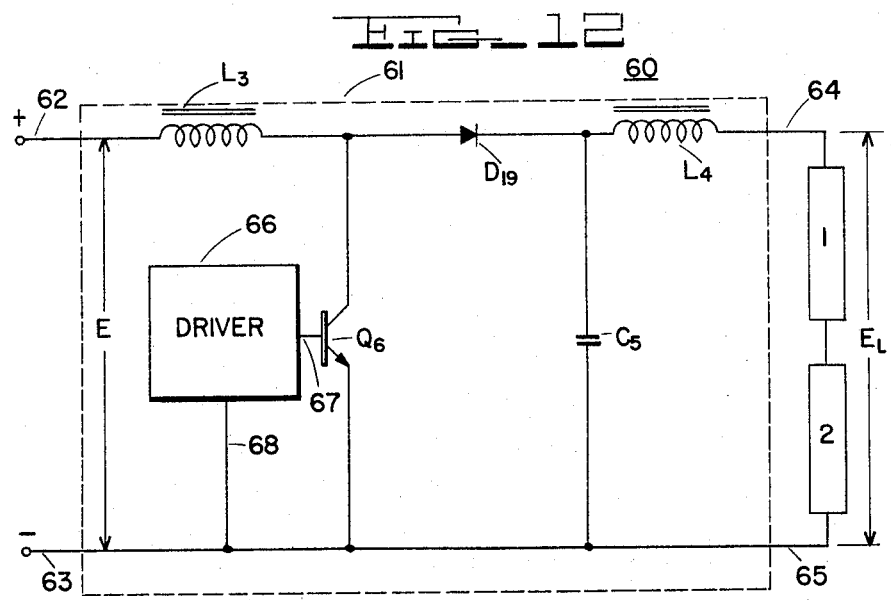

INVENTOR.
WALTER F. POWELL, JR.
BY Henry J. Moscovich
ATTORNEY

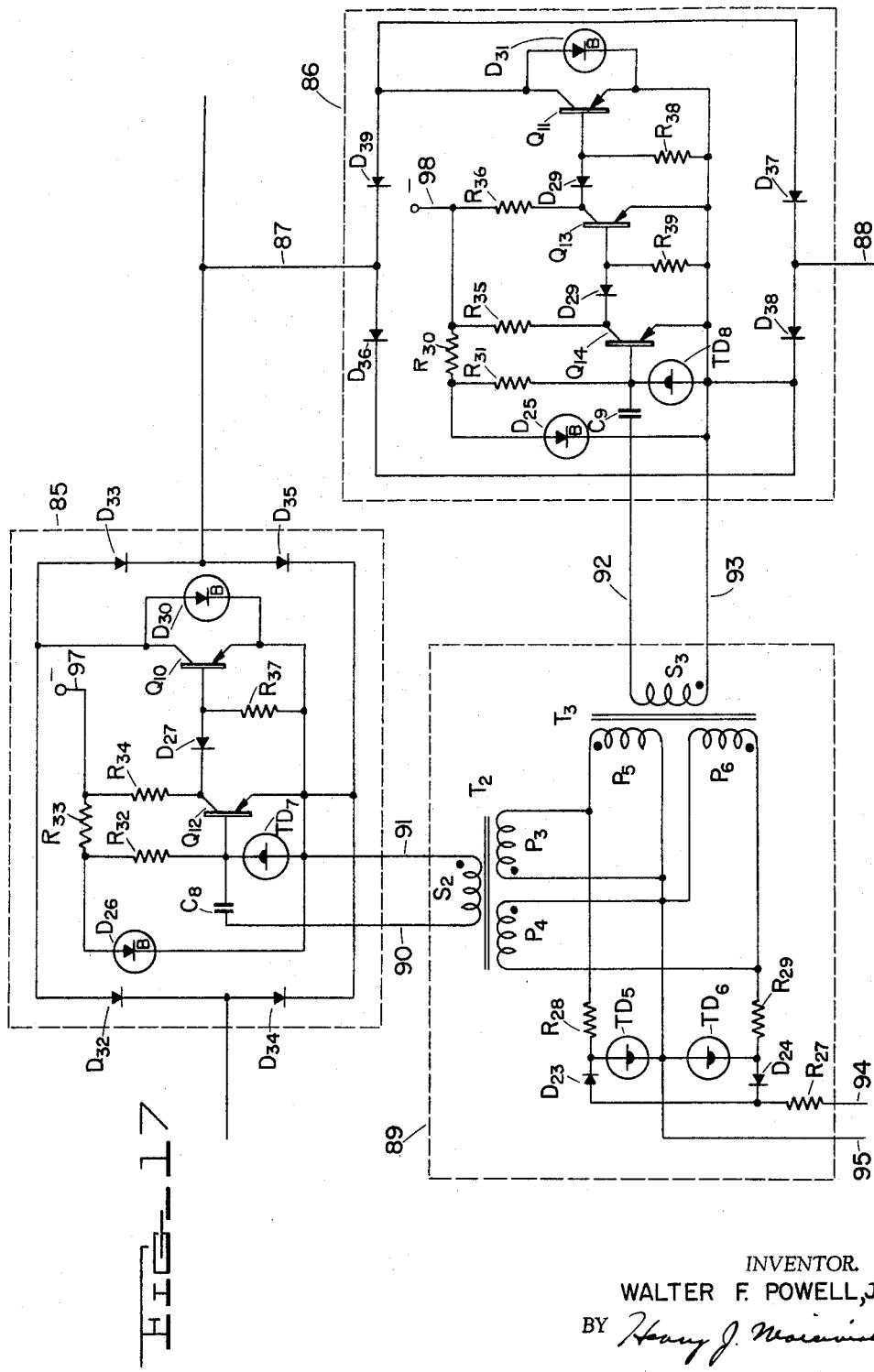

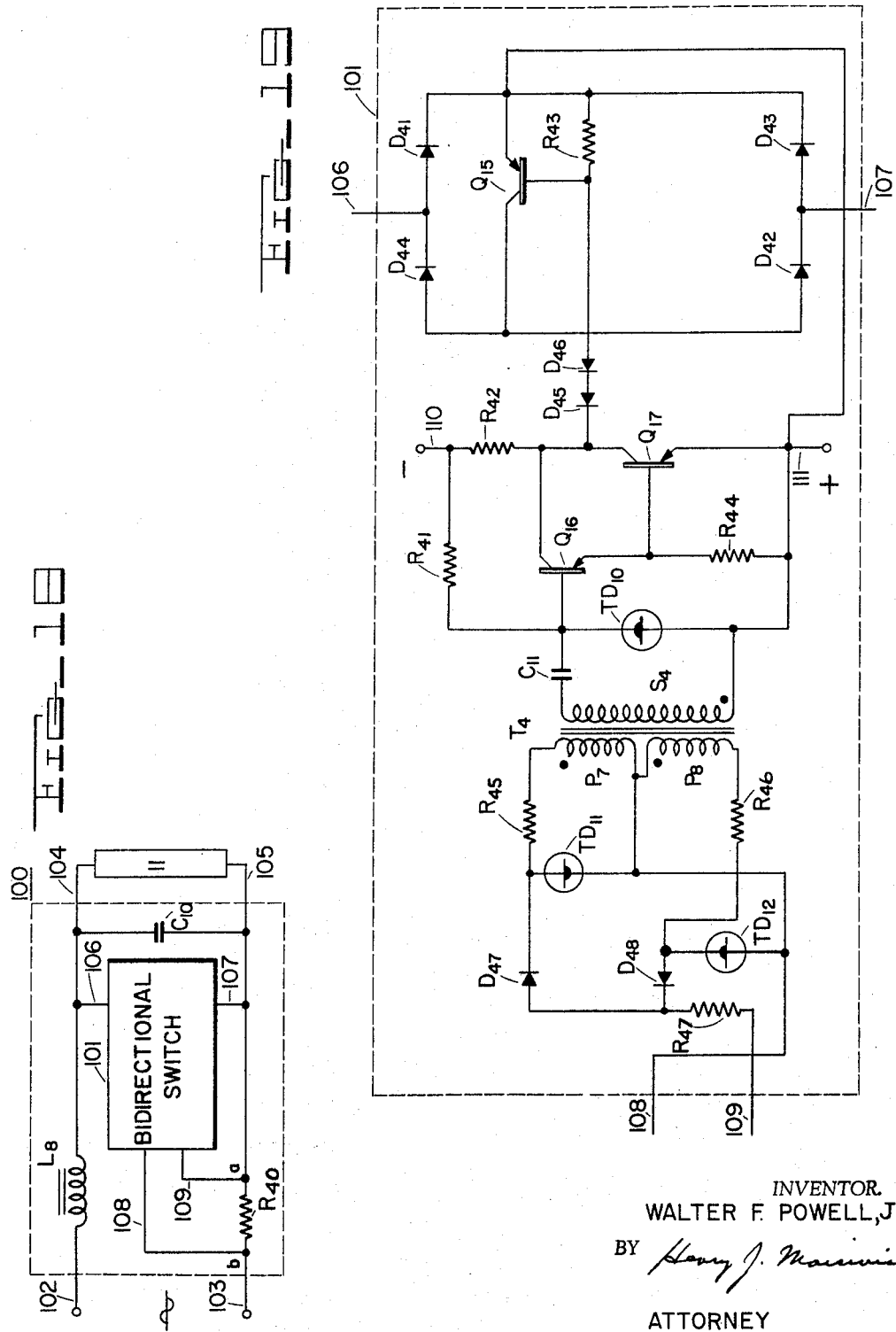

3,265,930
CURRENT LEVEL SWITCHING APPARATUS FOR OPERATING ELECTRIC DISCHARGE LAMPS
Walter F. Powell, Jr., Danville, Ill., assignor to General Electric Company, a corporation of New York
Filed May 3, 1962, Ser. No. 192,231
24 Claims. (Cl. 315—209)

This invention relates generally to apparatus for operating electric discharge devices such as fluorescent lamps, and more particularly, it relates to an improved ballasting and operating arrangement for such apparatus.

An electric discharge lamp usually includes an enclosure containing a gas or vapor and a pair of electrodes. If the electric discharge lamp is of the fluorescent type, the enclosure is coated with a fluorescent powder. An electric discharge must be initiated within the enclosure to provide radiation at a wave length at which the fluorescent powder coating is sensitive to excite the coating to a state of luminescence. Thus, when the electric discharge within the enclosure of the lamp is initiated, light is generated, and the lamp is usually referred to as being "started" or "ignited."

Essentially, the functions of the apparatus used to operate the electric discharge lamp or the so-called "ballast" are to start, maintain and control the electric discharge within the lamp enclosure. It will be understood that the electric discharge is initiated when a stream of positive ions within the enclosure moves generally from the anode to the cathode and a counter stream of electrons moves from the cathode to the anode. Where the electric discharge lamp is energized with alternating current, the electrodes alternate as anode and cathode as the polarity reverses in each half cycle.

The positive ions in the lamp enclosure are produced by ionizing collisions between electrons and the neutral particles of gas or vapor particles. A minimum amount of energy must be continuously furnished at the electrodes to cause sufficient ionizing collisions to occur in order to maintain the electrical conductivity of the discharge. These ionizing collisions in the discharge are necessary since the electron flow alone is not sufficient to produce the energy levels required for the production of light. Since the ionizing collisions cause free electrons to be liberated from the neutral particles, these free electrons are available to cause additional ionizing collisions. Unless the ionizing collisions in the electric discharge are controlled by the external operating apparatus, the current or electron flow at the electrodes will become excessive and destroy the lamp. This tendency of the ionizing collisions in the electric discharge to produce an excess of electrons causes the lamp to have a terminal to terminal dynamic negative resistance characteristic. To control the ionizing collisions in the electric discharge, the operating apparatus must limit the energy supplied to the lamp.

In conventional circuits used to operate electric discharge lamps with direct current, the energy supplied to the lamp is limited by placing a resistor in series circuit with the lamp. Where the electric discharge lamp is operated with alternating current, usually an inductor or a combination of inductor and capacitor connected in series circuit with the lamp serves as a ballasting element. The lamp, the ballasting element and driving voltage source form a closed series loop. When the ionization collisions in the electric discharge increase, the current in the external circuit and the voltage drop across the ballasting element increase. The voltage drop across the lamp decreases since the sum of the voltage drops in the circuit must be equal to the driving voltage which is fixed. Thus, the energy level at the lamp is reduced and the ionizing collisions in the electric discharge are diminished.

When the ionizing collisions in the electric discharge decrease, this condition is accompanied by a decrease in the electron or current flow out of the lamp thereby causing a proportional decrease in the voltage drop across the ballasting element. This decrease in voltage causes a corresponding decrease in the potential or energy level at the lamp. Consequently, the ionizing collisions in the electric discharge are increased. In this manner, control of the ionizing collisions in the electric discharge is maintained.

An inherent disadvantage of conventional A.C. ballasting systems is that the peak energy stored in the reactive elements in the system must be maintained at relatively high levels to perform the ballasting function and the relative rate of storage and release of this energy is low. This results in the use of heavy, bulky reactive devices, which are relatively expensive. A disadvantage of conventional D.C. ballasting systems is that a relatively large amount of power, generally about fifty percent of the power supplied, is dissipated in the ballasting resistor.

In a conventional 60 cycle ballast an open circuit voltage must be provided that is not only sufficient to provide the necessary starting potential for the electric discharge lamp but must also provide suitable regulation and stability characteristics for the ballast. If the difference between the open circuit voltage and the normal lamp operating voltage in a conventional ballast is small, slight changes in the supply voltage will produce appreciable variations in the light output of the lamp. Generally, a ballast for operating a single 40 watt rapid start fluorescent lamp will provide an open circuit voltage which is about twice as large as the operating voltage of the lamp. It will be appreciated that if the difference between open circuit voltage and the lamp operating voltage in a ballast is reduced and if the peak energy requirement of the storage element is reduced, it is possible to employ a smaller and less expensive storage element in the ballast. It is desirable, therefore, to provide an apparatus for operating electric discharge lamps that does not require a large difference between the open circuit voltage and lamp operating voltage and that does not require an appreciable amount of energy to be stored in the storage element of the system.

One of the continuing problems associated with illumination by electric discharge lamps is the reduction in the light output that occurs as the electric discharge lamps age. For example, a 96 PG 17 power groove fluorescent lamp will provide a 100 percent light output in the initial period of its life. After 2000 hours of operation the light output reduces to approximately 80 percent of its initial light output and after 10,000 hours of operation the light output decreases to approximately 50 percent. It is, therefore, desirable that an apparatus for operating electric discharge lamps be readily adaptable to regulation by feedback means so that the light output of the lamps can be maintained by the feedback means at a substantially constant value during their normal life.

Where the electric discharge lamp is operated with direct current, a conventional resistive ballasting element introduces an appreciable electrical loss into the system that reduces the over-all electrical efficiency of the system. In both direct current and alternating current ballasting systems, there is a need for improvement in electrical circuit efficiency.

Accordingly, it is a general object of the present invention to provide an improved apparatus for operating an electrical discharge device.

Another object of the present invention is to provide an improved apparatus for operating electric discharge lamps, such as a fluorescent lamp, wherein the peak energy stored in the apparatus is relatively small as compared with the peak energy stored in conventional 60 cycle ballasts.

It is still another object of the present invention to provide an improved apparatus for operating and ballasting electric discharge lamps that is readily adaptable to regulation by feedback means.

A more specific object of the invention is to provide an improved apparatus for operating electric discharge lamps that does not require a substantial difference between the open circuit voltage and the operating voltage of the electric discharge lamp.

It is a further object of the present invention to provide an improved apparatus for operating electric discharge lamps wherein the electrical efficiency can be readily designed into the apparatus.

Still a further object of the present invention is to provide an improved apparatus capable of operating electric discharge lamps at a substantially constant light output during the life thereof.

It is another object of the present invention to provide an apparatus for operating one or more fluorescent lamps that does not require the use of relatively heavy and bulky reactive devices such as high leakage reactance transformers.

In the broader aspects of the invention, an improved apparatus for operating one or more electric discharge devices, such as fluorescent lamps, is provided wherein the electric discharge of the device is controlled and maintained by repetitively activating a switching means to cause excursions of electrical current to be alternately supplied from the power source and a storage element in the operating circuit. Stabilization of the electric discharge of the device is achieved by repetitively switching the current between controllable levels. Preferably, the current levels are regulated in response to the change in various parameters sensed or detected by a feedback means. For example, lamp current, light output, lamp voltage, lamp power, line voltage, lamp hot spot temperature, ambient temperature, outdoor illumination or any combination of these parameters may be sensed by the feedback means for the purpose of controlling the switching action.

According to another aspect of the invention, an improved apparatus is provided for operating one or more electric discharge lamps from a power source wherein the supply voltage is stepped down to provide the voltage required to maintain the electric discharge of the lamp. The electric discharge of the lamps is stabilized by repetitively switching the apparatus to provide controlled excursions of current alternately from the power source and from the storage element in the apparatus.

In another form of my invention, I provide an improved apparatus embodying the current level switching arrangement of the invention wherein the supply voltage applied at the input of the apparatus is stepped up in magnitude to provide a relatively increased voltage across the lamp. In this embodiment of my invention, a first storage element is used to step-up the supply voltage when the power source is switched in to energize the lamp, and a second storage element is used to provide an excursion of current to the lamp when the power source is switched out of the lamp circuit and supplies energy to the first storage element.

I have also provided an improved apparatus incorporating the current level switching arrangement of the invention and supplying a bidirectional current to operate an electric discharge lamp. In this embodiment of the invention, the current level switching action is provided in both the positive and negative half cycles to maintain and stabilize the electric discharge. Preferably, the current levels are controlled in response to variations in the current, light output, or both.

The subject matter which I regard as my invention is set forth in the appended claims. The invention itself, however, together with further objects and advantages thereof may be better understood by referring to the following description taken in conjunction with the accompanying drawings in which:

FIGURE 3 depicts an oscillogram of the waveform of the lamp current produced by the apparatus shown in FIGURE 1;

FIGURE 4 illustrates a preferred form of my invention wherein the switching means of the improved apparatus for operating electric discharge devices is driven in response to a feedback means in voltage step-down arrangement;

FIGURE 5 is a schematic circuit diagram of the feedback driven switch shown in block form in FIGURE 4;

FIGURE 6 illustrates an oscillogram one cycle of the lamp current provided by the apparatus of FIGURE 4;

FIGURE 7 illustrates the lamp current waveform corresponding to a resistive value of one ohm for the shunt resistor $R_5$ and 680 ohms for the resistor $R_{10}$ of the apparatus shown in FIGURES 4 and 5;

FIGURE 8 illustrates the lamp current waveforms showing the effect produced by changing the resistive value of the shunt resistor $R_5$ from .5 ohm to two ohms in the apparatus shown in FIGURES 4 and 5;

FIGURE 9 illustrates lamp current waveforms showing the effect produced by varying the tunnel diode bias current from a minus .68 milliampere to a positive .035 milliampere in the apparatus shown in FIGURES 4 and 5;

FIGURE 10 illustrates lamp current waveforms showing the effect produced by varying the resistive value of the resistor $R_{10}$ connected in circuit with the anode of the tunnel diode in apparatus shown in FIGURES 4 and 5;

FIGURE 11 is a schematic circuit diagram of simplified feedback driven switching arrangement in accordance with the invention;

FIGURE 12 is a schematic circuit diagram of another embodiment of the invention wherein the supply voltage is stepped up and the switching means is driven by a free-running driver;

FIGURE 17 is a schematic circuit diagram of the bidirectional switch shown in block form in the diagram of FIGURE 16;

FIGURE 18 is a schematic diagram of an apparatus embodying the invention for operating electric discharge lamps with a bidirectional current in a voltage step-up arrangement;

FIGURE 19 is a schematic circuit diagram of the bidirectional switch shown in block form in FIGURE 18.

Figure 1:
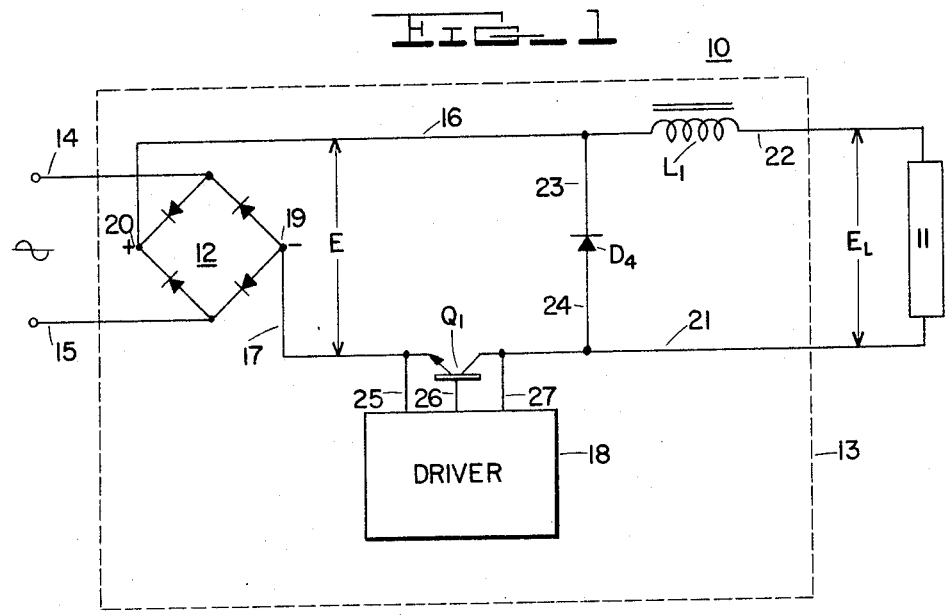
FIGURE 1 is a simplified schematic circuit diagram illustrating one embodiment of my invention wherein a free-running driver is used to repetitively switch the power source in and out of the lamp operating circuit in a voltage step-down arrangement.

In order to provide an outline of the more detailed disclosure of my invention, the major divisions of the remainer of this specification are summarized under the following headings:

I. Current Level Switching Arrangement for Operating Electric Discharge Devices Providing A Voltage Step-Down.
   A. Description of Apparatus Shown in FIGURES 1 and 2.
   B. Discussion of the Operation of Apparatus Shown in FIGURES 1 and 2.
   C. Description of Apparatus Shown in FIGURES 4 and 5.
   D. Discussion of the Operation of the Apparatus Shown in FIGURES 4 and 5.
   E. Description of the Apparatus Shown in FIGURE 11.
II. Current Level Switching Arrangement for Operating Electric Discharge Devices With a Step-Up in Voltage.
   A. Description of the Apparatus Shown in FIGURES 12 and 13.
   B. Discussion of the Operation of the Apparatus Shown in FIGURES 12 and 13.
   C. Description of the Apparatus Shown in FIGURE 15.
   D. Discussion of the Operation of the Apparatus Shown in FIGURE 15.
III. Apparatus for Operating Electric Discharge Lamps With a Bidirectional Current Employing the Improved Current Level Switching Arrangement of the Invention.
   A. Description of the Apparatus Shown in FIGURES 16 and 17.
   B. Discussion of the Operation of the Apparatus Shown in FIGURES 16 and 17.
   C. Description of the Apparatus Shown in FIGURES 18 and 19.
   D. Discussion of the Operation of the Apparatus Shown in FIGURES 18 and 19.
   D. Discussion of the Operation of the Apparatus Shown in FIGURES 18 and 19.

IV. General Considerations.

As a descriptive aid, the following reference letters will be used herein with consecutively numbered subscripts to designate various circuit components as indicated: C, capacitor; D, diode; L, inductor; P, primary winding; Q, transistor; R, resistor; S, secondary winding; T, transformer; and TD, tunnel diode.

In the drawings the conventional symbols for NPN and PNP transistors are employed. When the arrow on the emitter electrode is directed inwardly toward the base, the symbol denotes a PNP transistor and when the arrow on the emitter electrode is directed away from the base, the symbol denotes a NPN transistor.

In the interest of simplification, auxiliary starting aid circuits have not been shown in the schematic circuit diagrams of the illustrated exemplifications of my invention. It will be appreciated that starting aid circuits are not essential to the starting of an electric discharge lamp, and that where one is used it is generally possible to start the lamp at a lower potential level. In a well-known arrangement a conductive plate or strip is disposed in proximity to the lamp so that a starting aid potential is initially applied across an electrode and the conductive plate or strip to aid in initiating the electric discharge in the lamp. Accordingly, it will be understood that such auxiliary starting aid arrangements may be used in conjunction with the apparatus for operating electric discharge lamps to be hereinafter described.

I. CURRENT LEVEL SWITCHING ARRANGEMENT FOR OPERATING ELECTRIC DISCHARGE DEVICES WITH A VOLTAGE STEP-DOWN.

Figure 2:
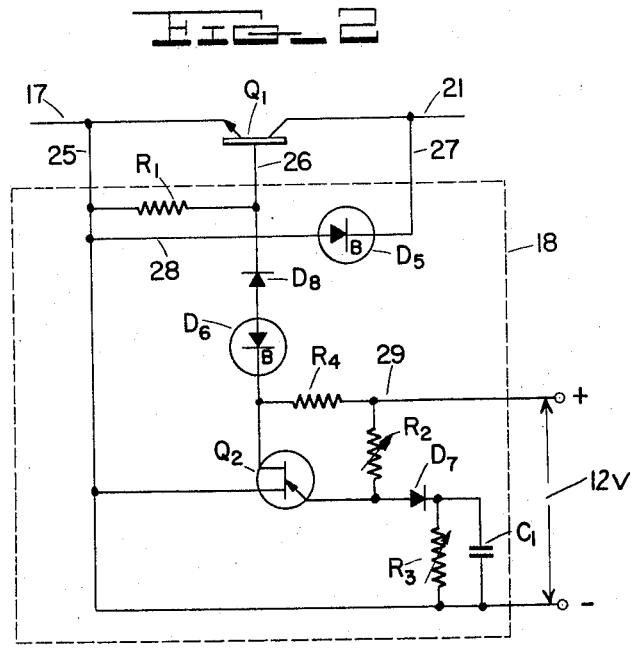
FIGURE 2 is a schematic circuit diagram of the driver shown in block form in the circuit diagram of FIGURE 1.

A. *Description of apparatus shown in FIGURES 1 and 2.*

In FIGURES 1 and 2, I have schematically illustrated an apparatus 10 incorporating one form of my invention in which an electric discharge device, such as a fluorescent lamp 11, is operated with direct current supplied by a full wave bridge rectifier 12. It will be noted that an inductive element $L_1$ is connected in circuit with the lamp 11 although an inductor does not impede the flow of direct current and would not be used as a ballasting element in a conventional ballast for operating electric discharge lamps with direct current. Generally, electric discharge devices operated with direct current are ballasted by a resistor or other resistive means such as an incandescent lamp.

Having more specific reference now to the schematic circuit diagram illustrated in FIGURE 1, the apparatus 10 is shown enclosed in a dashed rectangle 13. The apparatus 10 is energized by connecting a pair of input terminal leads 14 and 15 in circuit with a suitable alternating current supply which is schematically indicated as being sinosoidal in waveform.

In this particular embodiment of my invention, I have included a full wave bridge rectifier 12 as a component of the apparatus 10. It will be understood that the bridge rectifier 12 does not necessarily have to be included as a component of the apparatus 10. Where a suitable D.C. source is available, electrical leads 16, 17 may be connected the positive and negative side of the D.C. source.

To provide the switching action in accordance with the invention, a transistor switch $Q_1$ is coupled with a driver 18 which is shown in block form in the diagram of FIGURE 1 and in a schematic diagram in FIGURE 2. The transistor switch $Q_1$ is connected in circuit with the negative terminal 19 of bridge rectifier 12 by electrical lead 17 and also in circuit with the lamp 11 by an output lead 21. The positive terminal 20 of bridge rectifier 12 is connected by means of lead 16 with one end of an inductor $L_1$ which serves as an energy storage element, while the other end of the inductor $L_1$ is connected in circuit with lamp 11 by output lead 22. A diode $D_4$ is connected in a shunt path across inductor $L_1$ and lamp 11 by means of electrical leads 23 and 24 so that when the transistor switch $Q_1$ is activated into a high impedance state and the power source is cut off from the lamp 11, a closed path is provided for excursions of current from the inductor $L_1$ by the circuit means connecting the inductor $L_1$, the lamp 11, and diode $D_4$ (leads 21, 22, 23 and 24).

Turning now more specifically to FIGURE 2, I have illustrated therein a schematic circuit diagram of the driver 18 corresponding to the block 18 in the apparatus 10 of FIGURE 1. The driver 18 is connected in circuit with the NPN transistor switch $Q_1$ by means of the electrical leads 25, 26 and 27 which, as shown in both FIGURES 1 and 2, are connected in circuit with the emitter, base and collector electrodes respectively of transistor switch $Q_1$. A Zener diode $D_5$ is connected in circuit across the transistor $Q_1$ by leads 25, 27 and 28 to protect the transistor $Q_1$ from voltage transients. In order to reduce the delay that the transistor $Q_1$ exhibits before its collector current turns off, a resistor $R_1$ connected to the lead 25 provides a path for the base leakage current.

The driver 18 used in the exemplification of the invention is an astable multivibrator and supplies a rectangular pulse output across the emitter and base electrodes of the NPN transistor switch $Q_1$ at a predetermined frequency as primarily determined by variable resistors $R_2$, $R_3$ and a timing capacitor $C_1$. The timing capacitor $C_1$ is connected in circuit with a D.C. voltage bias supply, as for example, a positive 12 volt supply, through the resistor $R_2$ and a diode $D_7$. The D.C. voltage applied at terminal 29 provides the base drive for the transistor $Q_1$. It will be seen that the base drive current is supplied to the transistor $Q_1$ through resistor $R_4$, Zener diode $D_6$, diode $D_8$ and the lead 26. The Zener diode $D_6$ insures that the transistor $Q_1$ is forward biased only when the voltage at the anode of the Zener diode $D_6$ is in excess of its reverse breakdown voltage, which in the exemplification of the invention shown in FIGURES 1 and 2 was 6.8 volts. The diode $D_8$ serves as a reverse blocking diode means and prevents forward current flow through the Zener diode $D_6$.

It will be noted that one of the base electrodes of unijunction transistor $Q_2$ is connected in circuit with the base electrode of the transistor switch $Q_1$ and the other base electrode is connected to the electrical lead 25. When the unijunction transistor $Q_2$ is in a nonconducting state, the base electrode of the NPN transistor switch $Q_1$ will be positive with respect to the emitter and thereby cause transistor $Q_1$ to be switched to a low impedance state or to a closed position or condition.

Although in the embodiment of the invention illustrated in FIGURES 1 and 2 I have described a transistor as a suitable switching means, it will be appreciated that other switching devices as well as other driving circuits may be employed in the practice of our invention. For example, a silicon controlled rectifier driven by a D.C. chopper circuit of the type described at pages 142–148, Figure 9.9, of the General Electric Silicon Controlled Rectifier Manual, Second Edition 1961, may be adapted for use as a driven switching means in the apparatus of the invention.

B. Discussion of the operation of apparatus shown in FIGURES 1 and 2.

When a driving voltage E is applied across the leads 16, 17, a voltage $E_L$ is supplied across the output leads 21, 22 and the lamp 11. As the unidirectional switch $Q_1$ is repetitively activated from a high impedance state to a low impedance state at a predetermined frequency, the power source is alternately connected with the lamp 11 for an interval $t_1$ and disconnected for an interval $(t_2-t_1)$.

Referring to the oscillogram shown in FIGURE 3, it will be seen that beginning at point 0 where the lamp current is zero, the lamp current is building up in a positive direction for an interval $t_1$. During the interval $t_1$ transistor switch $Q_1$ is in a low impedance state and the output of the full wave bridge 12 is connected in circuit with lamp 11. It will be understood that when transistor switch $Q_1$ is in a low impedance state, diode $D_4$ is in a blocking state since the voltage at its cathode is positive with respect to the voltage at the anode. Further, the polarity of the voltage across the inductor $L_1$ is such that its left end as viewed in FIGURE 1 is positive with respect to its right end.

At the end of the interval $t_1$, transistor switch $Q_1$ is activated to a high impedance state and the power to the lamp 11 from the source is interrupted during the interval $(t_2-t_1)$. At the instant that the driven switch $Q_1$ is opened, the magnetic field in the inductor $L_1$ begins to collapse. A counter E.M.F. is induced in inductor $L_1$ that opposes the decline of the lamp current. Thus, during the interval $(t_2-t_1)$ the polarity of the voltage across the inductor $L_1$ is such that the left end of the inductor $L_1$ is negative with respect to the right end thereof. The diode $D_4$ in the shunt path of lamp $L_1$ is now forward biased. The electrical energy stored in the inductor $L_1$ is now supplied to the lamp in the form of a decaying current. The decaying current supplied to the lamp 11 during the interval $(t_2-t_1)$ is represented in FIGURE 3 by portion $a$–$b$ of the lamp current waveform.

At point $b$, transistor switch $Q_1$ is again driven to its low impedance state and the output of the bridge 12 is connected in circuit with lamp 11. For another interval $t_1$ electrical energy is supplied to the inductor $L_1$ and to lamp 11 from the power source. When the instantaneous lamp current reaches point $c$ at the end of a second interval $t_1$, transistor switch $Q_1$ is driven to its open position or high impedance state.

It will be apparent that the portions of the lamp current waveform $o$–$a$, $b$–$c$ and $d$–$e$ represent excursions of energy from the power source while the portions of the lamp current waveform $a$–$b$, $c$–$d$ and $e$–$f$ represent excursions of energy from the storage element or inductor $L_1$. As transistor switch $Q_1$ is successively opened and closed, controlled excursions of energy are alternately supplied from the storage element $L_1$ and the power source to maintain and control the electric discharge of lamp 11.

If we assume the electrical discharge lamp 11 is essentially a resistive load, the average voltage $E_L$ across the lamp will be approximately equal to the product of ratio $t_1/t_2$ and the average value of the driving voltage E. It will be evident from this relationship that the lamp voltage $E_L$ can be readily varied by the conduction and nonconduction intervals $t_1$ and $(t_2-t_1)$ of the transistor switch $Q_1$.

The intervals $t_1$ and $(t_2-t_1)$ are controlled by the driver 18 which activates the transistor switch $Q_1$ at a predetermined frequency. The interval $t_1$ is essentially determined by the duration of the positive pulse applied across the base and emitter electrodes of the transistor $Q_1$. The duration or width of the positive pulse is determined by the nonconduction interval of unijunction transistor $Q_2$.

It will be understood that the unijunction transistor $Q_2$ becomes forward biased, i.e., switched on, when the voltage charge on the timing capacitor $C_1$ reaches the peak point voltage of the unijunction transistor $Q_2$. When the unijunction transistor $Q_2$ is switched on, the anode of diode $D_7$ is clamped to lead 25, and diode $D_7$ is reversely biased. The capacitor $C_1$ then discharges through the variable resistor $R_3$ and at a predetermined point transistor $Q_2$ is turned off. The amount of resistance introduced in the path of this discharge controls the turnoff point of the unijunction transistor $Q_2$ and consequently the duration of the interval $(t_2-t_1)$ or the "off" time of the transistor switch $Q_1$. Thus, if the variable resistor $R_3$ is set to provide a high resistance, the point at which the potential at the cathode of the diode $D_7$ becomes approximately equal to the junction potential of the unijunction transistor $Q_2$ is delayed. When these potentials are about equal, the diode $D_7$ conducts current, and the emitter current decreases causing the unijunction transistor $Q_2$ to cut off, thereby causing the bias voltage to be applied across the transistor switch $Q_1$.

When diode $D_7$ is in a conducting state, charging current is supplied to the timing capacitor $C_1$. The charging rate is controlled by the variable resistor $R_2$, which effectively provides a control for the duration of the interval $t_1$ or the "on" time of the transistor switch $Q_1$. Increasing the amount of the resistance in the path of the charging current will, of course, delay the point at which the charge on the timing capacitor $C_1$ reaches the peak point voltage of the unijunction transistor $Q_2$ and consequently prolong the interval $t_1$. When the charge on the capacitor $C_1$ reaches the peak point voltage, unijunction transistor $Q_2$ is switched on again to remove the positive pulse applied across the base and emitter electrodes of the transistor switch $Q_1$. The timing capacitor $C_1$ then begins to discharge again through the resistor $R_3$ and the cycle repeats itself.

From the foregoing description of the operation of the apparatus shown in FIGURES 1 and 2, it will be apparent that the switching intervals of the transistor switch $Q_1$ can be readily varied by selecting suitable values for the resistors $R_2$ and $R_3$ to provide the switching action to control the operation of lamp 11 by repetitively switching the lamp current between high and low current levels. This switching action not only produces a step-down of the supply voltage required for the lamp 11 but also limits the lamp current.

C. *Description of apparatus shown in FIGURES 4 and 5*

An important advantage of the apparatus of the invention resides in its adaptability to regulation by means of a feedback means. The "on" and "off" intervals, $t_1$ and $(t_2-t_1)$, of the current level switching means can be readily controlled during operation by feedback arrangements which sense the lamp current, the light intensity of the electric discharge device, lamp voltage, lamp power, lamp hot spot temperature, or combinations of these and other quantities such as line voltage, ambient temperature and ambient illumination levels.

In FIGURE 4, I have illustrated a specific embodiment of my invention in which a transistor switch $Q_3$ is driven in response to the feedback of current from the lamp circuit. The apparatus 30 illustrated in FIGURE 4 is generally similar in arrangement to the apparatus shown in FIGURE 1 except that the transistor switch $Q_3$ is driven by a feedback means and is not a free running switch.

The apparatus 30 controls the operation of an electric discharge lamp 11 and is shown enclosed in a dashed rectangle 31. For the purpose of energizing the apparatus 30, a pair of input terminal leads 32 and 33 are brought out externally for connection to a suitable D.C. source which is not shown. The D.C. source may be a filtered or unfiltered rectified alternating current supply, a battery or other D.C. source.

An inductor $L_2$ serves as the storage element and is connected in the lamp circuit by output leads 34 and 35. A diode $D_9$ is connected in a shunt across lamp 11, inductor $L_2$ and resistor $R_5$ to provide a path for the current supplied from the inductor $L_2$ when the transistor switch $Q_3$ is switched to the open position. Resistor $R_5$ is connected in circuit with output lead 35 at one end and at the other end with an electrical lead 36 joined to the emitter of the transistor switch $Q_3$. The voltage drop across the shunt resistor $R_5$ is coupled to a driver 37 by means of a pair of feedback leads 38 and 39. A pair of leads 40, 41 are provided for connection to a suitable alternating supply to energize the driver 37. A Zener diode $D_{10}$ is connected in shunt with the transistor switch $Q_3$ to protect it from transient voltages.

In FIGURE 5, I have illustrated a schematic circuit diagram of the driver 37 corresponding to the driver 37 represented in block form in the apparatus 30 of FIGURE 4. The connecting leads 38, 39, 40 and 41 as shown in FIGURE 5 correspond to the connections of the schematic circuit diagram of FIGURE 4 which are identified by the same reference numerals. It will be noted that I have included in FIGURE 5 the transistor switch $Q_3$ and its connections.

The driver 37 is shown enclosed in a dashed rectangle and includes a PNP transistor $Q_4$, a NPN transistor $Q_5$ and a tunnel diode $TD_1$ that control the switching action of the transistor switch $Q_3$ as will hereinafter be more fully described. Resistors $R_6$, $R_7$, $R_8$ and $R_9$ maintain proper biasing conditions for the transistors $Q_3$, $Q_4$ and $Q_5$. A resistor $R_{10}$ connected in the feedback lead 39 limits the feedback current.

The switch driver arrangement illustrated in FIGURE 5 is more fully described and claimed in U.S. Patent No. 3,151,289 granted to Theodore R. Harpley and assigned to the same asignee as the present invention. An alternative switch driver arrangement which may be used in apparatus 30 is shown in FIGURE 11 and will be more fully discussed in connection with the description of FIGURE 11.

The base drive for the transistor $Q_4$ of the driver 37 and the driven transistor switch $Q_3$ is provided by a bias or driver power supply which includes input leads 40, 41, a full wave bridge rectifier 42, and a capacitor $C_2$. A resistor $R_{11}$ limits the current output of the driver power supply. A Zener diode $D_{15}$ clips the positive voltage at lead 43 to its reverse breakdown voltage (6.8 volts), and a positive bias current is supplied at lead 43. Also, a positive bias equal in magnitude to the sum of the forward voltage drop of diode $D_{16}$ and the reverse breakdown voltage of Zener diode $D_{15}$ is provided at lead 44. A second Zener diode $D_{17}$ connected in circuit with the negative terminal of the bridge 42 regulates the negative voltage and voltage equal to its reverse breakdown voltage (6.8 volts) is provided at lead 45 for the PNP transistor swtich $Q_3$.

The tunnel diode $TD_1$ connected across the feedback leads 38 and 39 of the driver 37 is a two terminal semiconductor device having a single PN junction. The P-layer is referred to herein as the anode and is shown schematically by the vertical line while the N-layer is referred to as the cathode and is shown schematically as an arcuate portion joined to the vertical or transverse line. When a forward voltage less than the peak point voltage is applied across the tunnel diode $TD_1$, it will exhibit a low resistance and may be considered as being in a low impedance state. For a range of intermediate values of the forward voltage, the tunnel diode $TD_1$ is characterized by a negative conductance. When the forward voltage exceeds the valley point voltage, the tunnel diode $TD_1$ has a characteristic similar to the forward characteristic of a conventional diode and may be considered as being in a high impedance or high voltage state. The characteristics of tunnel diodes of the type that may be used in the practice of our invention are more fully described in Chapter 2 of the General Electric Tunnel Diode Manual, First Edition, 1961.

D. *Discussion of operation of the embodiment shown in FIGURES 4 and 5*

When the input terminal leads 32, 33 of apparatus 30 are connected in circuit with a D.C. voltage source, of the polarity indicated on the drawing an open circuit condition in effect exists across the output leads 34 and 35, since the electric discharge lamp 11 presents a substantially infinite impedance before the electric discharge is initiated. During the open circuit condition there is no current flow through the shunt resistor $R_5$ and consequently the voltage drop across the resistor $R_5$ is at a zero level. The driver 37 holds the transistor switch $Q_3$ in a low impedance state during this open circuit condition. It will be noted that during the open circuit condition the supply voltage E is approximately equal to the voltage $E_L$ applied across the electric discharge lamp 11 and must be sufficient to start lamp 11.

When the electric discharge is initiated, current flows through the lamp 11 and through the shunt resistor $R_5$. The voltage drop across the shunt resistor $R_5$ increases proportionally with the current and when the current reaches a first level, the transistor switch $Q_3$ is driven to its "open" position or high impedance state. The power source is in effect disconnected from the lamp circuit. This interruption of power in the lamp circuit causes a counter E.M.F. to be induced in the inductor $L_2$ which is now a reverse polarity. This reversal of polarity results in a forward bias across the diode $D_9$. Diode $D_9$ conducts, and a path is provided through diode $D_9$ for an excursion of energy in the form of a decaying current from the inductor $L_2$. When this current declines to a second predetermined level, the transistor switch $Q_3$ is driven to a closed position, and current is supplied to the lamp 11 from the power source. During this switching mode, energy is also being stored in the inductor $L_2$.

It will be seen from the lamp current waveform shown in FIGURE 6 that as a result of the repetitive switching action of transistor switch $Q_3$, energy excursions from the power source and inductor $L_2$ alternately occur between the two predetermined levels. Since the energy level of the supply source is greater than that required to maintain the electric discharge in lamp 11, the energy supplied to lamp 11 from the source seeks to rise to this level but is chopped at a predetermined point by the transistor switch $Q_3$. As will be seen in the waveform shown in FIGURE 6, the portions $a$–$b$, $c$–$d$ represent excursions of energy from the inductor $L_2$ and the portions $b$–$c$, $d$–$e$ represent excursions of energy supplied from the power source. The valleys and the peaks of these current or energy excursions are controlled by the feedback to the driver 37 which actuates the transistor switch $Q_3$.

Since an unfiltered rectified direct current supply was applied across input leads 32, 33 in the illustrated embodiment of the invention of FIGURES 4 and 5, it will be appreciated that the lamp current waveform is cyclical. At the end of each cycle the lamp current decreases to a value below the minimum level even though the transistor switch $Q_3$ is held in the closed position until the current builds up in the succeeding half cycle.

Having more specific reference now to FIGURE 5, the operation of the driver 37 will now be more fully described. When the apparatus 30 is initially energized and no current flows through the shunt resistor $R_5$, the transistor switch $Q_3$ is in a conducting state because base drive is applied at the base electrode of transistor switch $Q_3$ from lead 45 of the bias supply through resistors $R_8$ and $R_6$. During this initial period, transistors $Q_4$ and $Q_5$ are in a non-conducting state. After the electric discharge in lamp 11 is stated, current builds up in the feedback lead 39. When this current reaches the peak point value of the tunnel diode $TD_1$, it switches from a low impedance state to a high impedance state. It will be noted that when the tunnel diode $TD_1$ is triggered into a high impedance state, the base electrode of the transistor $Q_5$ is more positive with respect to the emitter electrode than in the previous low impedance state of tunnel diode $TD_1$ and as a result transistor $Q_5$ is switched on.

When transistor $Q_5$ conducts, the base of transistor $Q_4$ is returned through resistor $R_7$ to the negative side of the Zener diode $D_{15}$ of the bias supply. Since the emitter electrode of transistor $Q_4$ is connected to lead 43 of the bias supply which supplies a positive bias (6.8 volts), the base electrode of transistor $Q_4$ is negative with respect to the emitter, and transistor $Q_4$ conducts. The positive bias at lead 43 is now applied at the base electrode of transistor $Q_3$, and the base of transistor $Q_4$ becomes positive with respect to its emitter. Transistor $Q_3$ is turned off, and the direct current supply to the apparatus 30 is switched off.

When transistor $Q_3$ is turned off, the power supply is essentially disconnected from the lamp circuit and the lamp 11 is energized by a decaying current supplied from the inductor $L_2$. The feedback current through resistor $R_{10}$ now proportionally decreases with the lamp current, and when the voltage across $TD_1$ reaches the valley point value of the tunnel diode $TD_1$, the tunnel diode $TD_1$ is reset to its low impedance state. When the tunnel diode $TD_1$ reverts to its low impedance state, the base of the transistor $Q_5$ is no longer sufficiently positive with respect to the emitter, and transistor $Q_5$ returns to a nonconducting state and turns off transistor $Q_4$. With transistor $Q_4$ switched off, the negative bias supply at lead 45 is applied at the base of transistor $Q_3$ through resistors $R_6$ and $R_8$. Therefore, transistor $Q_3$ is switched into a conducting state and the power source is again connected with the electric discharge lamp 11.

The apparatus 30 illustrated schematically in FIGURES 4 and 5 was constructed and satisfactorily operated two 30 watt fluorescent lamps in parallel and was capable of operating eight such lamps. The main supply voltage was obtained from a 120 volt, 60 cycle supply and was rectified by a full wave bridge rectifier. The unfiltered output of the bridge rectifier was applied across terminals 32 and 33. The alternating power supply was stepped down by a small transformer to provide a 26 volt supply at terminals 40 and 41 of driver 37. As is well-known in the art, a starting aid potential for lamp 11 was provided by placing a conductive plate in proximity to the lamp 11 so that the lamp 11 was disposed in capacitive relationship therewith. Also, a small filament transformer was used to supply heating current to the lamp filaments since a hot cathode type of lamp was used.

Referring now to FIGURES 4 and 5, the following circuit components were used in the illustrative exemplification of the invention and are given by way of example:

Bridge rectifier 42 _____ Mallory FW 600.
Inductor $L_2$ _____ 50 millihenries.
Shunt resistor $R_5$ _____ 1 ohm.
Resistor $R_6$ _____ 10 ohms.
Resistor $R_7$ _____ 1000 ohms.
Resistor $R_8$ _____ 100 ohms.
Resistor $R_9$ _____ 1000 ohms.
Resistor $R_{10}$ _____ 1500 ohms.
Resistor $R_{11}$ _____ 100 ohms.
Transistor $Q_3$ _____ B1013B Bendix development type.
Transistor $Q_4$ _____ 2N241A.
Transistor $Q_5$ _____ 2N636A.
Tunnel diode $TD_1$ _____ 1N2939.
Zener diode $D_{10}$ _____ 1N3051.
Zener diode $D_{15}$ _____ 1N3016B, 6.8 volts,
Zener diode $D_{17}$ _____ 1N3016B, 6.8 volts.
Zener diode $D_{17}$ _____ 1N1695.

The adaptability of the current level switching arrangement of the invention to feedback type of regulation is graphically demonstrated by the lamp current waveforms shown in FIGURES 7, 8, 9 and 10, which show the lamp current waveforms obtained for various values of different circuit parameters. In FIGURE 7 I have illustrated the lamp current waveform as observed on a cathode ray oscilloscope when the resistance of resistor $R_5$ was one ohm and the resistance of the the resistor $R_{10}$ was 680 ohms, which served as a basis for comparison. With these values, normal light output was obtained with a lamp current of 260 milliamperes D.C. and the frequency of switching was approximately 300 cycles per second. When the resistive value of the shunt resistor $R_5$ was increased to 200 ohms, the lamp current was reduced to approximately 2.6 milliamperes and a dimming ratio of approximately 100 to 1 was readily established. The frequency of switching at the low dimming level was approximately 30 kilocycles.

From the lamp current waveforms shown in FIGURE 8, it will be seen that small increases in the resistive value of the shunt resistor $R_5$ have the effect of substantially increasing the switching frequency. Also, it will be seen that for a resistive value of .5 ohm, only one excursion of energy was produced in each cycle of the current waveform. However, when the resistive value was increased to two ohms, five successive excursions of energy from the inductor $L_2$ were produced in each cycle of the lamp current waveform.

It will be apparent from the lamp current waveforms shown in FIGURE 9 that the lamp current can be readily varied by changing the bias applied to the tunnel diode $TD_2$ and also by varying the resistive value of the resistor $R_{10}$ connected in the feedback lead 39. As is shown in FIGURE 10, when the resistive value of resistor $R_{10}$ is decreased from 1500 ohms to 330 ohms, the magnitude of the lamp current decreases and the switching frequency also increases.

If it is desired to dim an electric discharge lamp over a wide range of dimming levels, this can be easily accomplished by varying the resistive value of the shunt resistor $R_5$ and the resistor $R_{10}$, by varying the tunnel diode bias current separately or in combination with the resistors $R_5$, $R_{10}$. For example, a value of bias current at some predetermined negative value within the limits imposed by tunnel diode dissipation may be selected to provide maximum light output at a peak current to valley current ratio of approximately 1.05 to 1. Where an electric discharge lamp is dimmed by varying one or more of the aforementioned circuit parameters, it will be understood that the open circuit voltage available to start the lamp is not affected. Consequently, the lamp is readily maintained in conduction at low dimming levels.

Referring again to the lamp current waveforms in FIGURES 7, 8, 9 and 10, it will be observed that the last peak of the cycle is not sharply defined like the peaks which occur earlier in the cycle. This is due to the fact that at the end of each half cycle the main supply voltage is falling off rapidly.

Although a rectified single phase alternating supply was used in the exemplification of the invention described in FIGURES 4 and 5 to operate the apparatus 30, a rectified three phase alternating supply can be advantageously employed in the practice of the invention. When a three phase rectified alternating power supply was used, it was found that the peak voltage to average voltage ratio could be reduced to approximately 1.05 and the switching mode of current control is continuous.

Since the peak value of the rectified voltage in a single phase system is approximately twice that of the average value required for continuous conduction of the electric discharge lamp 11, the semiconductor devices used in such a system must be capable of handling the peak voltage. An advantage resulting from the use of a rectified three phase power supply is that it may be possible to employ semiconductor devices having a lesser power rating than those that would be used in a rectified single phase system.

Although in this illustrated embodiment of the invention the switching means was driven in response to the current flow in the lamp circuit, it will be apparent that the feedback arrangement can be readily used to sense other quantities such as the light output of the electric discharge device using a photoelectric cell to sense the light output of the lamp. A combined light and current sensing arrangement provides the distinct advantage that a nearly constant light output can be maintained for the life of the electric discharge lamp. Accordingly, it will be evident that the present invention is readily adaptable to control by feedback means.

E. *Description of apparatus shown in FIGURE 11*

In the schematic circuit diagram shown in FIGURE 11, I have illustrated an apparatus 50 which embodies an alternative switch driving arrangement and which is generally similar to the apparatus 30 shown in FIGURE 4. As shown in FIGURE 11, the components of apparatus 50 are enclosed in a dashed rectangle 51. To show the correspondence between apparatus 50 of FIGURE 11 and apparatus 30 of FIGURE 4, I have employed the same reference symbols to identify the corresponding parts thereof.

The current level switching function in apparatus 50 is performed by a driven PNP junction transistor $Q_3$ connected in circuit with a terminal lead 33 adapted for connection to the negative side of the D.C. source. An inductor $L_2$ serves as the energy storage element and is connected in circuit with output lead 35. A shunt resistor $R_5$ serves as a sensing element of the feedback means and is joined in circuit with lamp 11 by an output lead 34 at one end and at the other end by the input terminal lead 32 provided for connection to the positive side of the D.C. power supply. Diode $D_9$ is connected in a shunt path across lamp 11 and inductor $L_2$ for the excursion of energy from the inductor $L_2$ when the transistor switch $Q_3$ is switched to the open position. Zener diode $D_{10}$ connected across transistor switch $Q_3$ protects the transistor switch $Q_3$ against damage from excessive transient voltages.

It will be noted that in the switch driving arrangement shown in FIGURE 11 the feedback means, which includes a tunnel diode $TD_2$, resistors $R_5$, $R_{12}$ and $R_{13}$ are coupled with the switch driver means by a pulse transformer $T_1$ having a primary winding $P_1$ and a secondary winding $S_1$. The switch driver means includes a second tunnel diode $TD_3$, a capacitor $C_3$, a resistor $R_{14}$ and a positive and negative driver supply terminals 52 and 49. The current provided through resistors $R_{14}$ and $R_{15}$ was sufficient to bias tunnel diode $TD_3$ slightly below its peak point value. The capacitor $C_3$ provides D.C. isolation of the secondary winding $S_1$ and pulse coupling with the tunnel diode $TD_3$. The resistor $R_{12}$ was required to prevent ringing in the loop which includes the primary winding $P_1$ and the tunnel diode $TD_2$.

Since in this switch driving arrangement, transistor switch $Q_3$ is normally in an open position, the apparatus 50 is not self-starting. Accordingly, a means for initially switching the transistor switch $Q_3$ into a closed position is provided which includes a starting switch 54, a capacitor $C_4$, resistors $R_{15}$, $R_{16}$ and a terminal 49 for connection to a negative bias supply.

The closing of switch 54 causes the resistor $R_{15}$ to be shorted momentarily allowing sufficient bias current to flow into tunnel diode $TD_3$ to cause it to flip to the high voltage state. When capacitor $C_4$ is charged, the short circuiting of resistor $R_{15}$ ceases. It will be appreciated that the capacitor $C_4$ can be eliminated where the closing interval of switch 54 can be controlled. Resistor $R_{16}$ allows capacitor $C_4$ to discharge after switch 54 is released.

The apparatus 50 is energized by connecting the input terminals 32, 33 to the positive and negative sides, respectively, of a D.C. source. Also, the terminals 49, 52 are connected to a suitable D.C. bias supply.

The operation of the apparatus 50 is initiated by actuating switch 54. As was previously described, the closing of switch 54 causes the resistor $R_{15}$ to be shorted momentarily allowing sufficient bias current to flow through resistor $R_{14}$ to tunnel diode $TD_3$ and switch it to a high voltage state. Consequently, transistor switch $Q_3$ is switched to the closed position. When transistor switch $Q_3$ is in the closed position, the power source across input terminal leads 32, 33 is connected in circuit with the lamp 11. The path of current flow is through the positive input terminal lead 32, the shunt resistor $R_5$, the output lead 34, the lamp 11, the output lead 35, the inductor $L_2$, the transistor switch $Q_3$ and the negative input terminal lead 33 back to the power source.

Since during this switching mode energy is being stored in the inductor $L_2$, the current through the shunt resistor $R_5$ is building up in magnitude and causing a proportionally increasing voltage drop across the shunt resistor $R_5$. The polarity of this voltage is such that the left end of the shunt resistor $R_5$ is positive with respect to the right end. A proportionally increasing current is supplied to the feedback resistor $R_{13}$ and to the loop which includes the tunnel diode $TD_2$, the resistor $R_{12}$ and the primary winding $P_1$. When the current through the tunnel diode $TD_2$ reaches the peak point value, tunnel diode $TD_2$ is switched to a high voltage state. This causes a sharp increase in the impedance of the tunnel diode $TD_2$, and a change in the current flow through the resistor $R_{12}$ and the primary winding $P_1$. As a result, a positive pulse is induced across the secondary winding $S_1$, tunnel diode $TD_3$ is reset to its low voltage state and transistor switch $Q_3$ is switched to its open position.

When transistor switch $Q_3$ is in the open position, lamp 11 is energized with a decaying current, since the main power source is disconnected from lamp 11. During this switching mode lamp 11 is energized by the release of the energy stored in the magnetic field of the inductor $L_2$. Accordingly, the instantaneous current through the shunt resistor $R_5$ is decreasing in magnitude, and the voltage drop across the shunt resistor $R_5$ is thereby proportionally decreasing. The current flow through the feedback resistor $R_{13}$ and through the tunnel diode loop also correspondingly decreases. When the current through the tunnel diode $TD_2$ drops below its valley point value, the tunnel diode switches to its low voltage state thereby effecting a sharp diversion from the primary winding $P_1$ and causing a negative pulse to be induced across the secondary winding $S_1$. This negative pulse causes the transistor switch $Q_3$ to be closed thereby again connecting the power source in circuit with the lamp 11. This switching action continues repetitively so long as the voltage applied across the shunt resistor $R_5$ is sufficient to actuate the tunnel diode $TD_2$.

II. CURRENT LEVEL SWITCHING ARRANGEMENT FOR OPERATING ELECTRIC DISCHARGE DEVICES WITH A STEP-UP IN VOLTAGE.

Figure 13:
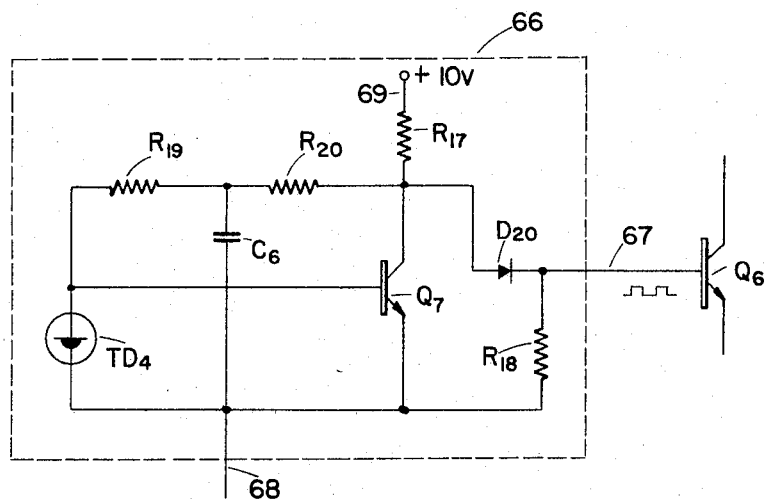
FIGURE 13 is a schematic circuit diagram of the driver shown in block form in circuit diagram of FIGURE 12.

A. *Description of the apparatus shown in FIGURES 12 and 13*

In the preceding section, I have described embodiments of the invention employing the concept of operating electric discharge lamps by a repetitive switching action wherein the voltage output of the apparatus was less than the voltage applied at its input. To further illustrate the versatility of the invention, I shall now describe additional embodiments of the invention wherein an output voltage $E_L$ is provided that is greater than the input voltage E. In other words, a step-up in the voltage is achieved in contrast to the voltage step-down provided by the previously described embodiments of my invention.

Referring now to the schematic circuit diagram shown in FIGURE 12, I have illustrated therein an apparatus 60, the components of which are enclosed in dashed rectangle 61. The apparatus 60 is energized by connecting a pair of input terminal leads 62 and 63 in circuit with the positive and negative side of a D.C. power source. The direct current power source may be a filtered or unfiltered rectified alternating current supply, a battery or other suitable D.C. power source. The voltage output of the apparatus 60 is applied by output leads 64, 65 across a pair of serially connected electric discharge lamps 1 and 2.

Although commercially available electric discharge lamps have been used in the exemplifications of the invention, it will be appreciated that the presently proposed concept of operating and ballasting electric discharge devices makes it attractive and practicable to develop electric discharge lamps for use in conjunction with the improved apparatus of the present invention. Present day electric fluorescent lamps have been designed as high voltage, low current type of devices. The apparatus in accordance with the invention renders electric discharge lamps designed for higher current and lower voltage operation particularly desirable in view of the current characteristics of solid state devices.

Continuing with the description of the physical arrangement of the apparatus 60 as shown in FIGURE 12, it will be seen that a first inductor $L_3$, a diode $D_{19}$, and a second inductor $L_4$ are connected in series circuit with the lamps 1 and 2. An NPN junction transistor switch $Q_6$ serves as the switching means and is driven by a driver 66, which is connected to the base electrode of transistor switch $Q_6$ by lead 67 and in circuit with the negative side of the power source by lead 68 and input lead 63. It will be noted that in this exemplification of the invention when the transistor switch $Q_6$ is driven to the closed position, a path for the current from the power source is provided which shunts the lamps 1 and 2.

Although a transistor switch was used in the illustrated embodiment, it will be understood that other switches capable of being repetitively switched from a low impedance state to a high impedance state a relatively fast rate can be employed. For example, a silicon controlled rectifier switch driven by a multivibrator circuit may be used to provide the switching action across input leads 62, 63 required to intermittently disconnect the power source from the lamps 1 and 2.

A capacitor $C_5$ connected in circuit across inductor $L_4$ and the serially connected lamps 1 and 2 serves as a first energy storage element and the inductor $L_3$ serves as a second energy storage element as will hereinafter be more fully described in the discussion of the operation of the apparatus 60. The inductor $L_4$ serves to control the discharge from capacitor $C_5$. Diode $D_{19}$ presents a high impedance between the source and the capacitor $C_5$ to prevent the discharge of energy stored in the capacitor $C_5$ to the power source and through the transistor switch $Q_6$ when it is in the closed position. Thus, the energy stored in capacitor $C_5$ is discharged through the lamps 1 and 2 and the inductor $L_4$ connected in series with the lamps.

Turning now to FIGURE 13, I have shown therein a schematic circuit diagram of the switch driver 66 used in the apparatus 60 of FIGURE 12. In this exemplification of the invention, I have employed a rectangular wave oscillator as the driver 66. The rectangular wave output of the driver 66 is applied across the base and emitter electrodes of the transistor switch $Q_6$. When a positive pulse appears at output lead 67, the transistor switch $Q_6$ is turned on and is turned off when the drive current is diverted through transistor $Q_7$. Terminal lead 69 is provided for connection to a positive 10 volt supply through a resistor $R_{17}$.

In order to speed the turn-off of transistor $Q_6$, a resistor $R_{18}$ is connected in circuit with the base electrode of transistor switch $Q_6$ and in circuit with the negative side of the main power supply by means of lead 68. It will be understood that when tunnel diode $TD_4$ is switched to its high voltage state, transistor $Q_7$ will conduct. In the exemplification of the invention, the voltage drop across the collector and emitter electrodes of transistor $Q_7$ was approximately one volt and might be sufficient to drive the base-emitter junction of transistor $Q_6$. To prevent this voltage from driving the base-emitter junction of transistor $Q_6$ to a conducting state, a silicon diode $D_{20}$ is connected in series with the base-emitter junction of transistor $Q_6$ and in effect functions as a low voltage Zener diode. Thus, it insures that when transistor $Q_7$ conducts, the base current drive is effectively diverted from transistor switch $Q_6$.

The driver 66 includes a tunnel diode $TD_4$ connected across the base and emitter electrodes of a transistor $Q_7$ and a charging and discharging circuit comprised of a capacitor $C_6$ and resistors $R_{17}$, $R_{19}$ and $R_{20}$. It will be noted that when tunnel diode $TD_4$ is in a low voltage state, transistor $Q_7$ is turned off, and transistor switch $Q_6$ is turned on since the driver current is supplied to the base electrode of the transistor switch $Q_6$ through resistor $R_{17}$ and diode $D_{20}$. When tunnel diode $TD_4$ is in a high voltage state, the base electrode of transistor $Q_7$ becomes more positive with respect to its emitter and it is switched to a closed position thereby clamping the collector to essentially terminal 68 and diverting the base drive current from transistor $Q_6$ through transistor $Q_7$ turning transistor $Q_6$ off.

B. *Discussion of the operation of the apparatus shown in FIGURES 12 and 13*

Having reference to the circuit diagrams shown in FIGURES 12 and 13, the operation of the apparatus 60 will now be more fully described. The operation of apparatus 60 is initiated by connecting terminal leads 62, 63 to the positive and negative sides respectively of a suitable direct current source such as a rectified alternating supply. A positive D.C. voltage supply is also applied at terminal 69 to energize the driver 66.

It will be understood that when the transistor switch $Q_6$ is closed, energy is stored in the magnetic field of inductor $L_3$. When the transistor switch $Q_6$ is opened, the interruption causes a reversal in the polarity of the voltage across inductor $L_3$, and the voltage across the inductor $L_3$ is in an additive or boosting relation with respect to the source voltage. This combined voltage is applied across capacitor $C_5$. As transistor $Q_6$ is successively switched during the lamp open circuit condition, the voltage across $C_5$ builds up until it reaches a level where it is sufficient to start the electric discharge in the serially connected lamps 1 and 2. Once the electric discharge is initiated, the lamps 1 and 2 conduct current.

Figure 14:
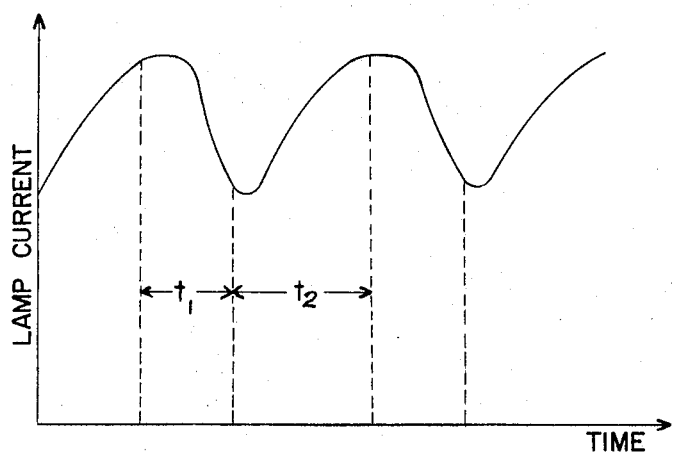
FIGURE 14 is an illustration of the waveform of instantaneous lamp current provided by the apparatus shown schematically in FIGURE 12.

Referring to the lamp current waveform shown in FIGURE 14, it will be seen that the lamps 1 and 2 are operated by a lamp current that is characterized by a high frequency ripple. This ripple in the lamp current is produced by the repetitive switching action of transistor switch $Q_6$ which causes alternate excursions of energy from the capacitor $C_5$ and from the inductor $L_3$ and the power source.

Assuming that $t_1$ represents the interval when the transistor switch $Q_6$ is closed, it will be noted from the lamp current waveform shown in FIGURE 14 that during this interval the current is decaying. Also, during the interval $t_1$ the voltage across the inductor $L_3$ is such that the left end of the inductor $L_3$, as seen in FIGURE 12, is positive with respect to the right end and energy is being stored in the magnetic field of the inductor $L_3$, and the supply current is shunted through the transistor switch $Q_6$ back to the supply. Continuity of the supply of the current to the lamps 1, 2 during the interval $t_1$ is maintained by the discharge of current from the capacitor $C_5$.

At the end of the interval $t_1$ the transistor switch Q is driven to an open position. The resultant interruption of current flow results in a reversal of the polarity of the voltage across $L_3$. Taking $t_2$ as the interval that transistor switch $Q_6$ remains open, the voltage across the inductor $L_3$ during this interval is in additive relationship to the supply voltage and this combined voltage is essentially applied across lamps 1 and 2 in series with the inductor $L_4$ and across the capacitor $C_5$. Current from the D.C. supply applied across input leads 62, 63 now flows through the inductor $L_3$, diode $D_{19}$, the parallel branch which includes the capacitor $C_5$, the parallel branch which includes the inductor $L_4$ and the lamps 1, 2, and to the negative side of the D.C. supply. During the interval $t_2$, energy is being supplied from the power supply and the inductor $L_3$ and is being stored in the capacitor $C_5$. At the end of the interval $t_2$, the transistor switch $Q_6$ is driven to a closed position, and the switching cycle repeats itself. Energy is again stored in the magnetic field of the inductor $L_3$, and the capacitor $C_5$ discharges to provide an excursion of current to maintain the conduction of the lamps 1 and 2.

The voltage build-up across output leads 64, 65 is a function of the relation between the stored energy and the impedance of lamps 1 and 2. If the lamps 1, 2 dissipate energy quickly, as the lamps 1, 2 will do when operating, the energy stored in the inductor $L_3$ is relatively small, and the voltage build-up across the lamps 1, 2 is small. However, if the lamps 1, 2 do not dissipate the energy supplied across output leads 64, 65, as is the case during the open circuit condition, the voltage continues to rise until the lamps 1, 2 are ignited and dissipate energy.

Referring now more specifically to the schematic circuit diagram of the driver 66 shown in FIGURE 13, the interval $t_1$ is determined by the duration or width of the positive pulses applied at the base electrode of transistor switch $Q_6$. The off time of these positive pulses determines the interval $t_2$. The duration and off time of the positive pulses may be varied by adjusting the parameters of the charging circuit of the driver 66. Thus, the pulse output can be varied for example, by adjusting the resistive value of the resistors $R_{17}$, $R_{19}$ and $R_{20}$ or by changing the capacitance of the capacitor $C_6$.

When a positive pulse is provided at the base electrode of transistor switch $Q_6$, transistor switch $Q_6$ is in a low impedance state, transistor $Q_7$ is in a blocking state, capacitor $C_6$ is charged through resistors $R_{17}$ and $R_{20}$ and tunnel diode $TD_4$ is in a low voltage state. During this period, the current through resistor $R_{19}$ is building up and when it reaches the peak point value, the tunnel diode $TD_4$ switches to its high voltage state. Transistor $Q_7$ is driven to saturation by the base current through the resistor $R_{19}$ and clamps the positive driver supply voltage to the negative side of the power supply through lead 68 causing the transistor $Q_6$ to be turned off. Capacitor $C_6$ then discharges through the resistors $R_{19}$ and $R_{20}$. When the current at the anode of the tunnel diode $TD_3$ falls below the valley point value, tunnel diode $TD_4$ is switched to its low voltage state, and one cycle of the rectangular wave output is completed.

From the foregoing description of the operation of the apparatus 60 shown in FIGURES 12 and 13, it will be apparent that energy from the power source is repetitively connected and disconnected from the lamps 1 and 2 by the transistor switch $Q_6$. It will be noted that in each switching mode of the apparatus 60 energy is stored in a storage element and is released from the storage element in the subsequent switching mode. During the switching mode corresponding to the open position of the transistor switch $Q_6$, energy is released from the inductor $L_3$ and is being stored in capacitor $C_5$ and dissipated in the lamp load. In the succeeding switching mode corresponding to the closed position of the transistor switch $Q_6$, energy is stored in the inductor $L_3$ and released from capacitor $C_5$. In this manner, the apparatus 60 provides an operating voltage for lamps 1, 2 that is greater than supply voltage and controls the operation of the lamps 1, 2.

Figure 15:
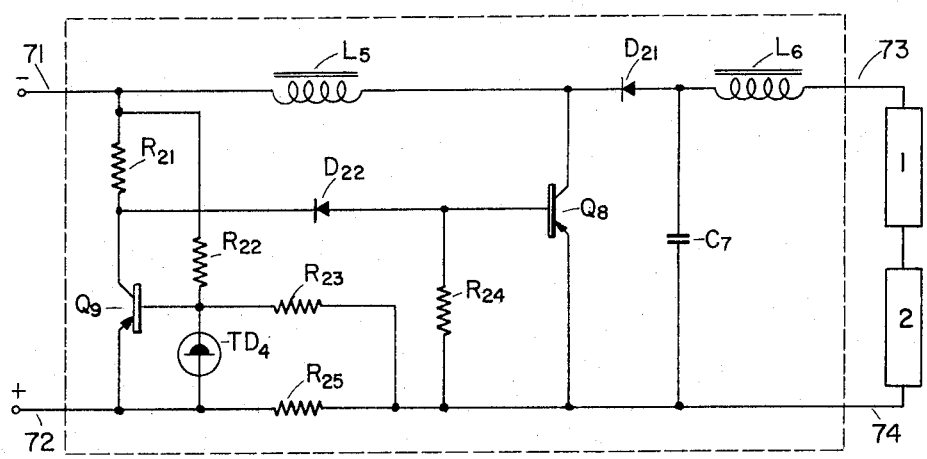
FIGURE 15 is a schematic circuit diagram of one form of the invention wherein the supply voltage is stepped up and the switching action is regulated in response to the current in an input lead of the apparatus.

C. *Description of the apparatus shown in FIGURE 15*

Referring now to the schematic circuit diagram shown in FIGURE 15, I have illustrated therein a voltage step-up arrangement in accordance with my invention wherein a switching means, a PNP junction transistor $Q_8$ is driven in response to variations in the supply current as sensed by a feedback means which supplies a feedback signal to activate the switch driver circuit. It will be noted that the basic circuit configuration is similar to that shown in FIGURES 12 and 13, except for the switch driver circuit which is not a free running oscillator but a feedback controlled oscillator.

The apparatus shown in FIGURE 15 is generally identified by the reference numeral 70 and is adapted for operation from a D.C. voltage source by connecting input terminal leads 71 and 72 to the negative and positive side of the source. The output current of the apparatus 70 is supplied to a pair of serially connected electric discharge lamps 1 and 2 by means of output leads 73 and 74. Where hot cathode fluorescent lamps are employed, it will, of course, be understood that a heating current must be supplied to the cathodes of the lamps, as for example, by a small filament transformer (not shown).

The transistor switch $Q_8$ is connected in a shunt path across the lamps 1, 2 so that when the transistor switch $Q_8$ is driven to a closed position, the supply current shunts lamps 1 and 2 and when the transistor switch $Q_8$ is driven to an open position, the D.C. source is connected in circuit with the lamps 1, 2. In other words, as the transistor switch $Q_8$ is activated, the power source is switched in and out of the lamp circuit.

An inductor $L_5$ is connected in circuit with the input terminal lead 71 provided for connection to the negative side of the power supply and serves as a first energy storage element in accordance with the invention. A capacitor $C_7$ serves as a second energy storage element. To control the discharge of the capacitor $C_7$, an inductor $L_6$ is connected in the discharge path of the capacitor $C_7$ as shown in FIGURE 15. Diode $D_{21}$ prevents capacitor $C_7$ from discharging through the transistor switch $Q_8$ when it is switched to the closed position.

Transistor switch $Q_8$ is repetitively switched on and off by a driver circuit means which senses the current in input lead 72. The driver circuit means includes a PNP transistor $Q_9$, which has its emitter and collector electrodes connected in circuit across input terminal leads 71 and 72. The bias current to the base electrode of the transistor switch $Q_8$ is limited by a resistor $R_{21}$.

A tunnel diode $TD_4$ is connected across the base and emitter electrodes of transistor $Q_9$ and serves to detect the level of the current feedback. Resistors $R_{22}$ and $R_{23}$ control the bias conditions of the tunnel diode $TD_4$ and the transistor $Q_9$. A resistor $R_{24}$ connected with the base electrode of transistor $Q_9$ provides a path through which the junction displacement current may be discharged when the transistor $Q_9$ is switched open. A resistor $R_{25}$ shunts current into the circuit branch which includes the resistor $R_{23}$ and tunnel diode $TD_4$. A diode $D_{22}$ is connected at the base electrode of transistor $Q_8$ and prevents the voltage drop across the emitter junction of transistor $Q_9$ when it conducts from driving the base emitter junction of the transistor switch $Q_8$ to a conducting state.

D. *Discussion of the operation of the apparatus shown in FIGURE 15*

Operation of the apparatus 70 is initiated by applying a D.C. source across the input terminal leads 71 and 72. The transistor switch $Q_8$ is repetitively opened and closed for intervals that are determined by the rate at which the tunnel diode $TD_4$ is switched to a high voltage state and reset to a low voltage state. When tunnel diode $TD_4$ is in a low voltage state, the transistor $Q_9$ is switched off, since its base electrode is clamped to the emitter and positive side of the power source through input lead 72. Transistor $Q_8$ is driven to saturation by the current flow through a path which includes the terminal lead 72, the emitter and base electrode of transistor $Q_8$, diode $D_{22}$, the resistor $R_{21}$ and terminal lead 71. Accordingly, transistor $Q_8$ is switched into a closed position.

During this switching mode, the path of current flow is from input terminal lead 72, through the shunt resistor $R_{25}$, the transistor switch $Q_8$, the inductor $L_5$, and to the input terminal lead 71. Thus, energy is being stored in the magnetic field of the inductor $L_5$, and the current is building up causing the voltage drop across the shunt resistor $R_{25}$ to increase. Also, the current through resistor $R_{23}$ is increasing, and when this current reaches the peak point value the tunnel diode $TD_4$ is switched to its high voltage state. The base electrode of transistor $Q_9$ is now negative with respect to the emitter, transistor $Q_9$ conducts and diverts the current from the base electrode of transistor $Q_8$ causing it to turn off.

At the instant that transistor switch $Q_8$ is turned off, the polarity of the voltage across the inductor $L_5$ reverses so that it is in additive relationship to the source voltage. Hence, inductor $L_5$ discharges its stored energy and steps up the source voltage. The current now supplied to lamps 1, 2 decays. The feedback current to tunnel diode $TD_4$ also proportionally decays, and when the voltage across the tunnel diode $TD_4$ drops to its valley point value, the tunnel diode $TD_4$ is reset to a low voltage state, thereby causing the transistor $Q_9$ to be switched off and transistor switch $Q_8$ to be switched on. Electric energy is again stored in the inductor $L_5$ and the cycle continues to repeat itself. As the switching cycle repeats itself, the voltage across the capacitor $C_5$ builds up until the lamps 1, 2 are started (it is not necessary that they be allowed to go out in each cycle of operation).

When lamps 1, 2 are started and transistor switch $Q_8$ is in the open position, the path of current flow is from the positive input terminal lead 72 through the shunt resistor $R_{25}$, through the parallel branch including capacitor $C_7$ and the parallel branch including output lead 74, lamps 1, 2 and the inductor $L_6$, the diode $D_{21}$, the inductor $L_5$, and to the input terminal lead 71. During this switching mode, the operation of lamps 1 and 2 is controlled by the combined excursions of energy from the power source and from the inductor $L_5$. Further, these excursions of energy also charge the capacitor $C_7$. Since the energy released from the inductor $L_5$ is in the form of a decaying current, the voltage drop across the shunt resistor $R_{25}$ decreases and the tunnel diode $TD_4$ is again reset to its low voltage state when its voltage reaches the valley point value. Accordingly, transistor $Q_9$ is again switched off and the transistor $Q_8$ is turned on to start another switching cycle. The repeated excursions of energy are controlled by the switching action of the transistor switch $Q_8$ which is driven by a feedback signal from the line current supplied at the positive input lead 72.

During the switching mode when transistor switch $Q_8$ is closed or in its low impedance state, the lamps 1 and 2 are energized by an excursion of energy from the capacitor $C_7$. Energy stored in the capacitor $C_7$ in the preceding switching mode is now discharged, and the path of current flow is in a closed loop which includes capacitor $C_7$, output lead 74, lamps 1 and 2, output lead 73, and the inductor $L_6$. The inductor $L_6$ prevents the energy stored in the capacitor $C_7$ from being suddenly discharged through the lamps. The diode $D_{21}$ prevents capacitor $C_7$ from discharging through transistor $Q_8$ when transistor $Q_8$ is closed.

In a voltage step-up arrangement, it will be understood that the normal operating voltage of the lamps 1 and 2 must be above the D.C. supply voltage. Unless the normal operating voltage is greater than the D.C. supply voltage, the output current will continue to rise until a failure occurs.

III. APPARATUS FOR OPERATING ELECTRIC DISCHARGE LAMPS WITH BIDIRECTIONAL CURRENT EMPLOYING THE IMPROVED CURRENT LEVEL SWITCHING ARRANGEMENT OF THE INVENTION

Figure 16:
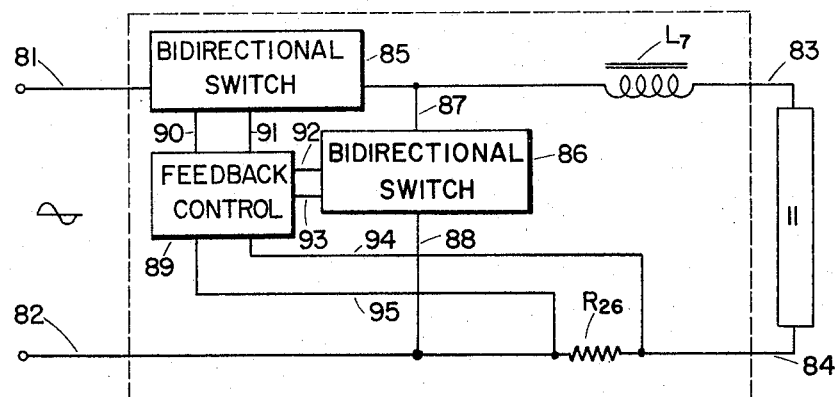
FIGURE 16 is a simplified schematic circuit diagram of an apparatus embodying the invention for operating electric discharge lamps with a bidirectional current in a voltage step-down arrangement.

A. *Description of apparatus shown in FIGURES 16 and 17*

In the preceding Sections I and II, I have described embodiments of my invention wherein electric discharge lamps were operated with a chopped unidirectional or unipolar current. By way of further exemplification of my invention, I shall now describe embodiments of my invention for operating electric discharge lamps with a bidirectional current.

Referring now to FIGURE 16, I have shown therein a schematic circuit diagram of an apparatus 80 embodying the current level switching arrangement of the invention for operating an electric discharge lamp 11. When a bidirectional current is applied across input leads 81, 82, a bidirectional current is applied across output leads 83, 84 and lamp 11. The current level switching function in accordance with the invention is carried out by a bidirectional switch which is connected in circuit with input terminal lead 81 and with an inductor $L_7$. A second bidirectional switch 86 is connected in series with bidirectional switch 85 and across input terminal leads 81, 82 by leads 87, 88.

The bidirectional switches 85, 86 are synchronously opened and closed by a feedback control 89 which is coupled with bidirectional switches 85 and 86 and by means of electrical leads 90, 91 and 92, 93, respectively. It will be seen that the feedback control 89 is also connected across a shunt resistor $R_{26}$ by electrical leads 94, 95.

Essentially, the bidirectional switches 85 and 86 function as a single pole double throw switch. When one of the switches is driven to the open position, the other is synchronously driven to a closed position. Thus, when switch 85 is driven to the open position, the power supply is disconnected from the lamp circuit. During the interval that the power supply is disconnected, switch 86 is in a closed position, a path is provided for the discharge of energy stored in the inductor $L_7$, and the conduction of the lamp 11 is maintained during this interval by this energy. This path includes the inductor $L_7$, output lead 83, lamp 11, output lead 84, the shunt resistor $R_{26}$, the electrical lead 88, the bidirectional switch 86 and electrical lead 87.

When switch 85 is driven to a closed position, switch 86 is synchronously driven to an open position by the feedback control 89, and the power source is now connected in circuit with lamp 11. During this switching mode, energy is supplied to lamp 11 and stored in the storage element or inductor $L_7$. A path for the current supplied from the power source is provided by input lead 81, bidirectional switch 85, inductor $L_7$, output lead 83, lamp 11, output lead 84, shunt resistor $R_{26}$, and input lead 82. Thus, in each half cycle of the alternating current supply, the current level switching action of the bidirectional switches 85 and 86 limits the current supplied to lamp 11 and provides the ballasting action required because of the negative resistance characteristic of the electric discharge lamp. Further, the current level switching action provides a stepdown in the supply voltage. In other words, the discharge lamp 11 is operated at a voltage that is less than the average voltage applied across the input terminal leads 81, 82.

It will be appreciated that the apparatus of the invention can be readily adapted to provide either a step-down or a step-up in the supply voltage. In FIGURES 18 and 19, I have illustrated an embodiment of the invention wherein the alternating voltage of the power supply is stepped up to operate the electric discharge lamp with bidirectional current.

Having reference now to the schematic diagram of FIGURE 17, I have shown therein detailed circuit diagrams of the bidirectional switches 85, 86 and the feedback control 89 corresponding to the blocks 85, 86 and 89 shown in FIGURE 16. Referring more specifically to the feedback control 89 as shown in FIGURE 17, it will be seen that a feedback signal is supplied to the feedback control 89 through leads 94, 95 to resistor $R_{27}$ and steering diodes $D_{23}$ and $D_{24}$. Steering diode $D_{23}$ is forward biased during the positive half cycle while steering diode $D_{24}$ is forward biased during the negative half cycle.

The opening and the closing of the bidirectional switches 85, 86 are synchronized in the positive half cycle by the pulses generated across secondary windings $S_2$ and $S_3$ of pulse transformers $T_2$ and $T_3$. A negative pulse across secondary winding $S_2$ and the input leads 90, 91 of bidirectional switch 85 will cause the normally closed transistor $Q_{10}$ to be driven to an open position and a negative pulse across the secondary winding $S_3$ and input leads 92, 93 will cause the normally open transistor switch $Q_{11}$ to be driven to a closed position.

It will be noted that primary winding $P_3$ of the pulse transformer $T_2$ and the primary winding $P_5$ of pulse transformer $T_3$ are connected in parallel with each other in a loop which includes a resistor $R_{28}$ and tunnel diode $TD_5$. Similarly, the primary windings $P_4$ and $P_6$ of the pulse transformers $T_2$ and $T_3$ are connected in parallel with each other and in a loop which includes a resistor $R_{29}$ and tunnel diode $TD_6$. It will be observed that tunnel diode $TD_6$ is poled so that when it is switched to a high voltage state during the negative half cycle, the change in current through the primary windings $P_4$ and $P_6$ causes a negative pulse to be induced across the secondary windings $S_2$ and $S_3$.

Having more particular reference now to the bidirectional switches 85, 86 as shown in FIGURE 17, these circuits will now be more fully described. A tunnel diode $TD_7$ and a PNP transistor $Q_{12}$ comprise a bistable flip flop circuit for driving the transistor switch $Q_{10}$. Similarly, tunnel diode $TD_8$ and the PNP transistors $Q_{13}$ and $Q_{14}$ comprise a bistable flip-flop circuit for driving the transistor switch $Q_{11}$. Terminals 97 and 98 are provided for connection to a suitable bias supply such as a negative 10 volt D.C. supply (not shown). A Zener diode $D_{25}$ and resistors $R_{30}$ and $R_{31}$ control the bias conditions for tunnel diode $TD_8$. Similarly, a Zener diode $D_{26}$ and resistors $R_{32}$ and $R_{33}$ perform a similar function for the bidirectional switch 85. Resistors $R_{34}$, $R_{35}$, $R_{36}$ limit base drive current to transistors $Q_{10}$, $Q_{13}$ and $Q_{11}$, respectively. The Zener diodes $D_{25}$ and $D_{26}$ regulate the bias voltage since the Zener diodes $D_{25}$, $D_{26}$ start conducting when the voltage applied at their terminals reaches the breakdown voltage of the Zener diodes $D_{25}$, $D_{26}$ and they continue to conduct varying amounts of current while the voltage across the Zener diodes $D_{25}$, $D_{26}$ remains substantially fixed at the breakdown voltage.

In order to provide for D.C. isolation and pulse coupling of the secondary winding $S_2$, a capacitor $C_8$ is connected in circuit therewith. Similarly, a capacitor $C_9$ is connected in circuit with the secondary winding $S_3$. Diodes $D_{27}$, $D_{28}$, $D_{29}$ are connected with the base electrodes of transistors $Q_{10}$, $Q_{11}$ and $Q_{13}$. Diode $D_{27}$ prevents the voltage drop across the collector and emitter electrodes of transistor $Q_{12}$ when transistor $Q_{12}$ conducts from driving the base-emitter junction of transistor switch $Q_{10}$ to a conducting state. Similarly, diode $D_{28}$ prevents the voltage drop across the collector and emitter electrodes of transistor $Q_{13}$ from driving transistor switch $Q_{11}$. Diode $D_{29}$ performs a similar function for transistor $Q_{13}$. The resistors $R_{37}$, $R_{38}$ and $R_{39}$ provide a path for discharge current when the transistors $Q_{10}$, $Q_{11}$ and $Q_{13}$ are switched to the open position. Zener diodes 30 and 31 connected across the emitter and collector electrode of the transistor switches $Q_{10}$ and $Q_{11}$, respectively, protect the transistor against excess transient voltages.

It will be noted that four diodes $D_{32}$, $D_{33}$, $D_{34}$, $D_{35}$ are connected in a bridge arrangement across the transistor switch $Q_{10}$ to provide for a bidirectional switching action. Thus, diodes $D_{34}$ and $D_{33}$ provide a path through transistor $Q_{10}$ during the positive half cycle and diodes $D_{35}$ and $D_{32}$ provide a path for current flow through transistor switch $Q_{10}$ during the negative half cycle. Similarly, in the bidirectional switch 86 diodes $D_{36}$ and $D_{37}$ are forward biased during the positive half cycle of the alternating current supply while diodes $D_{38}$ and $D_{39}$ are forward biased during the negative alternation. Although in this illustrated embodiment of the invention, two driven switches were employed, it will be apparent that a single switching means functioning as a single throw double pole switch may be used.

B. *Discussion of the operation of the apparatus shown in FIGURES 16 and 17*

During operation, the normally closed bidirectional switch 85 repetitively disconnects and connects the power supply from the lamp circuit without regard to polarity of the power supply, the interval that bidirectional switch 85 is in the open position and disconnects the power supply from the lamp circuit, bidirectional switch 86 is synchronously driven to a closed position. During the interval that switch 85 is open, current to lamp 11 will flow in a path which includes the inductor $L_7$, output lead 83, lamp 11, output lead 84, lead 88, switch 86 and lead 87. Lamp 11 receives energy from the inductor $L_7$ during this interval. When bidirectional switch 85 is closed, bidirectional switch 86 is synchronously driven to the open position. During this switching mode, lamp 11 is directly energized from the alternating power supply through switch 85, inductor $L_7$ and resistor $R_{26}$. Also, during this interval, energy is stored to the inductor $L_7$. The path of current flow comprises a closed loop which essentially includes the power source, input terminal lead 81, switch 85, inductor $L_7$, output lead 83, lamp 11, output lead 84, shunt resistor $R_{26}$ and input terminal lead 82.

Referring now more specifically to the schematic circuit diagrams of the bidirectional switches 85, 86 and the feedback control 89, the manner in which the switches 85 and 86 are synchronously driven will be more fully explained. Let us consider an arbitrary positive alternation of the alternating current supply. The voltage applied at input terminal lead 81 is assumed to be positive during this alternation. As the voltage begins the excursion from zero towards the positive peak, switch 85 is in its closed position, and switch 86 is in its open position. Tunnel diode $TD_5$ of the feedback control 89 is in a low voltage state. Also, tunnel diodes $TD_7$ and $TD_8$ are in a low voltage state since the bias current supplied thereto is maintained at a level slightly below the peak point value. It will be understood that when tunnel diode $TD_7$ of switch 85 is in the low voltage state, the base drive from transistor $Q_{12}$ is removed, and transistor $Q_{12}$ is in a nonconducting state. Accordingly, base drive is applied through resistor $R_{34}$ and diode $D_{27}$ to transistor switch $Q_{10}$. Therefore, transistor $Q_{10}$ is in a low impedance state.

Turning now to the driver circuit of bidirectional switch 86, at the instant the alternating voltage starts its excursion from zero towards the positive peak, transistor $Q_{14}$ is turned off since tunnel diode $TD_8$ is in a low voltage state. When transistor $Q_{14}$ is turned off, base drive is applied through resistor $R_{35}$ and diode $D_{29}$ to the base electrode of transistor $Q_{13}$, and transistor $Q_{13}$ conducts. When transistor $Q_{13}$ conducts, base drive is removed from the transistor switch $Q_{11}$. Therefore, transistor switch $Q_{11}$ is in a high impedance state or in an open position.

As the current builds up in the lamp circuit, there is a corresponding build-up of the current flowing through loop in the feedback control 89 which includes the steering diode $D_{23}$, the resistor $R_{28}$, the parallel connected primaries $P_3$ and $P_5$, and tunnel diode $TD_5$. When this current reaches the peak point value of the tunnel diode $TD_5$, tunnel diode $TD_5$ switches to its high voltage state and causes a diversion of current through the primary windings $P_3$ and $P_5$ which are inductively coupled with secondaries $S_2$ and $S_3$. A negative pulse is induced in each of the secondary windings $S_2$ and $S_3$.

Turning first to the normally closed switch 85, at the instant a negative pulse is induced across the secondary winding $S_2$, tunnel diode $TD_7$ is switched into its high voltage state causing base drive to be applied to transistor $Q_{12}$. Transistor $Q_{12}$ conducts and diverts the base drive from the transistor switch $Q_{10}$. Therefore, transistor switch $Q_{10}$ is switched to the open position.

Considering now the normally open switch 86, when a negative pulse is induced across the secondary winding $S_3$, tunnel diode $TD_8$ is switched into a high voltage state thereby causing the base drive to be applied to transistor $Q_{14}$. Transistor $Q_{14}$ is driven to saturation and it conducts, diverting the base drive from transistor $Q_{13}$. When transistor $Q_{13}$ is switched off, the base drive is supplied to the base electrode of transistor $Q_{11}$ through resistor $R_{36}$ and diode $D_{28}$ to drive transistor switch $Q_{11}$ to the closed position.

From the foregoing description, it will be apparent that when switch 85 is switched to its open position, switch 86 is synchronously switched to its closed position. The switches 85 and 86 will remain respectively in an open and closed position until tunnel diode $TD_5$ is reset to its low voltage state.

When switch 85 is driven to an open position and switch 86 to a closed position, the inductor $L_7$ reverses its polarity due to the interruption of current flow and releases energy, to maintain the current flow through the lamp 11. A decaying current flows through shunt resistor $R_{26}$. This results in a depression of the voltage across the shunt resistor $R_{26}$ and consequently, the voltage across the tunnel diode $TD_5$ decreases. When the voltage across tunnel diode $TD_5$ reaches the valley point value, tunnel diode $TD_5$ is switched back to its low voltage state and causes a change in the current flow through the primary windings $P_3$ and $P_5$. A positive pulse is then induced across the secondary windings $S_2$ and $S_3$ of the pulse transformers $T_2$ and $T_3$.

When a positive pulse appears across the secondary winding $S_2$, tunnel diode $TD_7$ is reset to its low voltage state causing the base drive to be diverted from transistor $Q_{12}$ and thereby turning off transistor $Q_{12}$. When transistor $Q_{12}$ is turned off, base drive is applied to transistor switch $Q_{10}$ through resistor $R_{34}$ and diode $D_{27}$. Thus, transistor switch $Q_{10}$ is switched into the closed position.

Simultaneously, the transistor switch $Q_{11}$ is switched to its open position when the positive pulse appears across secondary winding $S_3$. This is brought about as follows: The positive pulse causes the tunnel diode $TD_8$ to be reset to its low voltage state. Consequently, transistor $Q_{14}$ is switched off. When transistor $Q_{14}$ is switched off, base drive is applied to the base electrode of transistor $Q_{13}$ through resistor $R_{35}$ and diode $D_{29}$. Therefore, transistor $Q_{13}$ conducts and diverts the base drive from the transistor switch $Q_{11}$. Transistor switch $Q_{11}$ is, therefore, switched to its high impedance state. This repetitive switching action controls the operation of the lamp 11 during the positive alternation of the alternating current supply.

During the negative alternation of the alternating current supply, steering diode $D_{23}$ is reversed biased and steering diode $D_{24}$ is forward biased. Therefore, during this half cycle the tunnel diode loop which includes tunnel diode $TD_6$, resistor $R_{29}$ and primary windings $P_4$ and $P_6$, comes into play. As the current increases in a negative direction at the start of the cycle the voltage across the shunt resistor $R_{26}$ also increases in a negative direction thereby causing the current to tunnel diode $TD_6$ to increase. When the current through the tunnel diode $TD_6$ reaches the peak point value, tunnel diode $TD_6$ is switched to a high voltage state causing a change in the current flow through the primary windings $P_4$ and $P_6$, and a negative pulse is induced across the secondary windings $S_2$ and $S_3$.

During the negative alternation the driver circuits function in the same manner as they do in the positive alternation. A negative pulse across the secondary windings $S_2$ and $S_3$ causes the transistor switches to be synchronously switched, transistor switch $Q_{10}$ being driven to an open position and transistor switch $Q_{11}$ being driven to a closed position. A positive pulse across the secondary windings $S_2$ and $S_3$ causes the switches 85 and 86 to be reset to normally closed and normally open conditions, respectively. As in the positive half cycle, the current level switching action continues during the negative half cycle to supply a stepped-down operating voltage for the electric discharge lamp 11 and to provide the ballasting action for the electric discharge.

C. Description of apparatus shown in FIGURES 18 and 19

In FIGURES 18 and 19, I have illustrated an embodiment of my invention wherein the current level switching arrangement is utilized in a voltage step-up arrangement to operate an electric discharge lamp with bidirectional current. An apparatus 100 embodying my invention is shown in a general schematic diagram in FIGURE 18. A detailed schematic circuit diagram of the bidirectional switch 101 is shown in FIGURE 10. A pair of input terminal leads 102, 103 are brought out from the apparatus 100 for connection to an alternating power supply. A pair of output leads 104, 105 are brought out from apparatus 100 and are connected across an electric discharge lamp 11.

In accordance with the invention, the bidirectional switch 101 is connected in circuit with an inductor $L_8$ and input terminal leads 102, 103 so that when the bidirectional switch 101 is closed, the power supply shunts the lamp circuit. It will be noted that the shunt path is provided by connections 106 and 107 which place the switch 101 across the lamp 11 and a capacitor $C_{10}$. A pair of electrical leads 108 and 109 connect the bidirectional switch 101 in circuit with a shunt resistor $R_{40}$ to activate the switch 101 in response to variations in the input current.

Referring now more particularly to the schematic circuit diagram of the bidirectional switch 101 as shown in FIGURE 19, it will be observed that the current level switching action is carried out by a transistor switch $Q_{15}$ which is repetitively driven from a high to a low impedance state during each half cycle of the alternating current supply. Diodes $D_{41}$ and $D_{42}$ are forward biased during the positive alternations and provide a path for the current through transistor switch $Q_{15}$ during each positive half cycle while the diodes $D_{43}$ and $D_{44}$ provide a path for current through the transistor switch $Q_{15}$ during the negative half cycle.

Transistor switch $Q_{15}$ is driven by a bistable flip flop circuit wihch includes a tunnel diode $TD_{10}$ and transistors $Q_{16}$ and $Q_{17}$. The bias supply for the tunnel diode $TD_{10}$ and transistors $Q_{15}$, $Q_{16}$ and $Q_{17}$ is provided by connecting terminals 110 and 111 to a suitable D.C. source (not shown). Resistors $R_{41}$, $R_{42}$ limit the bias current, and resistors $R_{43}$ and $R_{44}$ connected in circuit with base electrodes of transistors $Q_{15}$ and $Q_{17}$ are provided to speed the cut-off response. Diodes $D_{45}$, $D_{46}$ prevent the voltage drop across the collector and emitter electrodes of transistor $Q_{17}$ when transistor $Q_{17}$ conducts from driving transistor switch $Q_{15}$ to a conducting state. A capacitor $C_{11}$ connected in series circuit relation with the secondary winding $S_4$ of transformer $T_4$ provides for D.C. isolation and pulse coupling with the bistable flip flop circuit.

The bistable flip flop circuit is triggered by a pulse induced across secondary winding $S_4$ of a pulse transformer $T_4$ having a pair of primary windings $P_7$ and $P_8$. Primary winding $P_7$ is connected with a tunnel diode circuit which includes a resistor $R_{45}$, a tunnel diode $TD_{11}$ and a steering diode $D_{47}$. The steering diode $D_{47}$ is forward biased during each positive alternation of the power supply and steers current to tunnel diode $TD_{11}$. In each negative alternation of the power supply, the tunnel diode circuit, which includes the steering diode $D_{48}$, tunnel diode $TD_{12}$, a resistor $R_{46}$ and primary winding $P_8$, comes into play. The tunnel diode circuit provides the pulses required to trigger and reset the bistable flip flop circuit which drives the transistor switch $Q_{15}$. A feedback resistor $R_{47}$ limits the current feedback from the input lead 103. The resistors $R_{45}$ and $R_{46}$ prevent ringing in the tunnel diode circuits.

D. *Discussion of the operation of the apparatus shown in FIGURES 18 and 19*

Having reference to both FIGURES 18 and 19, the operation of apparatus will now be more fully explained. At the start of an arbitrary half cycle of the alternating input when the voltage is positive and increasing, the current through the inductor $L_8$, the normally closed bidirectional switch 101, and through the shunt resistor $R_{40}$ beings to increase. The voltage drop across the shunt resistor $R_{40}$ is such that point *a* is positive with respect to point *b*.

Referring now more specifically to the schematic circuit diagram shown in FIGURE 19, the voltage appearing across the shunt resistor $R_{40}$ causes a current to flow through the feedback resistor $R_{47}$, through the steering diode $D_{47}$, the tunnel diode $TD_{11}$, and through the resistor $R_{45}$ and the primary winding $P_7$ of the transformer $T_4$. Since the current is rising and has not reached the peak point of the tunnel diode $TD_{11}$, the tunnel diode $TD_{11}$ is in a low voltage state and the increasing current flow in primary winding $P_7$ does not produce a pulse in the secondary winding $S_4$. When the voltage across the shunt resistor $R_{40}$ reaches a level where the current in the tunnel diode $TD_{11}$ is at the peak point value, the tunnel diode $TD_{11}$ switches to a high voltage state. This causes a sharp diversion of the current to the primary winding $P_7$, and a negative pulse is induced in the secondary winding $S_4$ of the pulse transformer $T_4$.

Before a pulse is induced across the secondary winding $S_4$, tunnel diode $TD_{10}$ is in a low voltage state since the injection current supplied through resistor $R_{41}$ is sufficient to bias the tunnel diode $TD_{10}$ to a level slightly below its peak point. When a negative pulse appears across the secondary winding $S_4$, the tunnel diode $TD_{10}$ switches to its high voltage state. Further, when tunnel diode $TD_{10}$ is in a high voltage state, the transistors $Q_{16}$, $Q_{17}$ are switched into conduction and the base drive is removed from the transistor switch $Q_{15}$. As a result, the transistor switch $Q_{15}$ is turned off or switched to a high impedance state.

When the transistor switch $Q_{15}$ is turned off, a reversal in the polarity of the voltage across inductor $L_8$ occurs, and the voltage across inductor $L_8$ adds to the supply voltage, thereby causing lamp 11 to ignite. As the current supplied to lamp 11 decays, the voltage across the shunt resistor $R_{40}$ begins to decrease. Consequently, the current through resistor $R_{47}$, diode $D_{47}$, tunnel diode $TD_{11}$, and the primary winding $P_7$ of the transformer $T_4$ also decreases. When voltage across the shunt resistor $R_{40}$ falls to a level where the current through tunnel diode $TD_{11}$ reaches the valley point value, the tunnel diode $TD_{11}$ is reset to its low voltage state thereby causing current to be diverted from the primary winding $P_7$. This change in current flow produces a change in flux linking the secondary winding $S_4$ and a positive pulse is induced in secondary winding $S_4$. This positive pulse causes tunnel diode $TD_{10}$ to be reset to its low voltage state. When tunnel diode $TD_{10}$ is in the low voltage state, there is insufficient base drive to keep transistors $Q_{16}$ and $Q_{17}$ in a conducting state. Transistors $Q_{16}$ and $Q_{17}$ are therefore switched off and a negative bias is applied to the base of transistor $Q_{15}$. Thereupon, transistor $Q_{15}$ is driven into saturation, and the bidirectional switch 101 is closed or switched to a low impedance state.

With the bidirectional switch 101 closed, the supply current shunts lamp 11 and flows in a loop which includes the power source, input lead 102, the inductor $L_8$, connection 106, the bidirectional switch 101, connection 107, resistor $R_{40}$ and input lead 103. During this switching mode, the current through resistor $R_{40}$ builds up. Lamp 11 turns off instantaneously with the closure of switch 101. The capacitor $C_{10}$ absorbs current while lamp conduction is getting underway and then immediately discharges through lamp 11 when lamp conduction is initiated. When the current to tunnel diode $TD_{11}$ reaches the peak point value, the bidirectional switch is again opened. This switching action continued during the positive half cycle so long as the voltage remains at a sufficient level to activate the tunnel diodes $TD_{11}$ and $TD_{10}$.

When the alternating current applied at the input leads 102, 103 swings negative, the bidirectional switch 101 is closed at the start of the negative half cycle since the voltage is insufficient to activate the tunnel diode $TD_{12}$. The polarity of the voltage across the shunt resistor $R_{40}$ will be such that point *b* will be positive and point *a* will be negative. The steering diode $D_{48}$ will be forward biased and current will now flow through resistor $R_{47}$, the steering diode $D_{48}$, and in the loop which includes tunnel diode $TD_{12}$, the resistor $R_{46}$ and the primary winding $P_8$. When the current reaches the peak point value of the tunnel diode $TD_{12}$, the tunnel diode $TD_{12}$ is switched into a high voltage state. This causes a diversion of current to the primary winding $P_8$ of transformer $T_4$, and a negative pulse is induced in the secondary winding $S_4$. As in the positive half cycle, a negative pulse will switch on transistors $Q_{16}$ and $Q_{17}$ and cause the base drive to be diverted from the base electrode of the transistor $Q_{15}$ causing it to be switched off. When transistor $Q_{15}$ is switched off, the bidirectional switch 101 is turned off. A decaying current will now flow through the shunt resistor $R_{40}$ because stored energy is being discharged from an inductive element, the inductor $L_8$. When the voltage across the shunt resistor $R_{40}$ decreases to a point where the voltage across tunnel diode $TD_{12}$ is at its valley point value, it switches to a low voltage state thereby causing current to be diverted from the primary winding $P_8$ of transformer $T_4$. Thus, a positive pulse is induced in the secondary winding $S_4$ which, as previously described, will cause the transistor $Q_{15}$ to be switched on.

From the foregoing description, it will be apparent that the bidirectional switch 101 is repetitively open and closed in substantially the same manner during each alternation of the power supply. The switching action continues until the voltage falls off to a point where the current to the tunnel diodes $TD_{10}$, $TD_{11}$ and $TD_{12}$ is insufficient to activate them.

IV. GENERAL CONSIDERATIONS

An important advantage of a current level switching arrangement of the present invention resides in the adaptability of the apparatus to control by a feedback signal responsive to the lamp operating condition. For example, the switching action used to control the operation of an electric discharge lamp in accordance with the invention can be regulated in response to feedback from a photoelectric cell sensing the light output of the lamp. In such a feedback means, the energy supplied to a lamp can be increased as its light output decreases.

It will be appreciated that when conventional 60 cycle ballasts are used to operate fluorescent lamps, such as 96PG17 high output power groove lamps, the light output diminishes to approximately 70 percent of its original light output after 6000 hours of operation. With the switching arrangement of the present invention and with feedback from a photoelectric cell sensing the light output, it is possible to maintain the light output substantially at a constant level during the life of the lamp. Although in the specific exemplifications of my invention, feedback arrangements sensing input current and lamp current have been described, it will be apparent that other parameters can be sensed by the feedback means used to regulate switching action of the improved apparatus embodying my invention. For example, lamp voltage, lamp power, light output, lamp hot spot temperature, lamp temperature, ambient temperature, outdoor illumination may be used as control parameters in the feedback means.

With the switching arrangement of the invention, it has been possible to achieve satisfactory current regulation with a relatively small difference between the open circuit voltage and the lamp operating voltage. Current regulation was considered satisfactory when not more than one percent change in light output was obtained for a one percent change in the supply voltage. It will be appreciated that to obtain satisfactory current regulation in a conventional 60 cycle ballast, the supply voltage must generally be about 100 percent greater than the operating voltage for a single rapid start lamp. For a single instant start type of lamp, the open circuit voltage required is about three times as great as the supply voltage. Although it has been possible to operate electric discharge lamps with no appreciable difference between the lamp R.M.S. voltage and the supply R.M.S. voltage, by using the switching arrangement of the invention, it was found that when the open circuit voltage was about 20 percent greater than the operating voltage satisfactory current regulation was obtained. It is possible with the current level switching arrangement of the invention to operate 36 and 48 inch T12 fluorescent lamps directly from a 120 volt alternating power supply with satisfactory regulation. By way of comparison, in a conventional 60 cycle ballast using reactive type of ballasting, only a 24 inch T12 fluorescent lamp can be operated directly from a 120 volt power supply.

Since the switching action in the apparatus of the invention is carried out at a relatively high rate and the energy excursions resulting from the switching action occur at a high frequency, small increments of energy are used to control the operation of the lamps and consequently, the peak energy requirement of the storage element is significantly reduced as compared with the conventional ballast. It will be understood that if the same open circuit voltage to lamp operating voltage ratio were used in the apparatus of the invention as would be used in a corresponding 60 cycle ballast, the volt-ampere requirement of the storage element would be the same even though its peak energy storage requirement was reduced. However, by the use of a feedback driven switching means, it is possible to reduce the open circuit voltage to lamp operating voltage ratio and to achieve a reduction in the volt-ampere requirement of the storage element. Thus, by achieving reductions in both the peak energy and volt-ampere requirements of the storage element, smaller and less expensive storage elements may be employed.

When the apparatus of the invention is operated with a switching frequency in a range between 1000 and 10,000 cycles per second, the main loss constituent in the system is the small energy storage element. Accordingly, electrical efficiencies between 90 and 97 percent can be obtained and can be readily designed into the system. With the current level switching arrangement of the present invention a desired electrical efficiency can be obtained by selecting the switching frequency and quality ratio of the storage element that will provide the desired electrical efficiency.

From the foregoing discussion of the advantages of the invention and from the above description of the various embodiments of the invention, it will be apparent that many modifications of the invention may be made. For example, it will be apparent to those skilled in the art that many switch driver arrangements and switching means other than those used in the specific embodiments of my invention may be employed to carry out the switching function in accordance with the invention. Therefore, I intend by the appended claims to cover all such modifications that fall within the true spirit and scope of the invention.

What I claim as new and desire to secure by Letters Patent in the United States is:

1. An apparatus for operating an electric discharge lamp from a power source, said apparatus comprising at least one energy storage element, a switching means, driver means responsive to a predetermined increase in the energy supplied to the electric discharge lamp to drive said switching means to a high impedance state and responsive to a predetermined decrease in said energy to drive said switching means to a low impedance state, and circuit means including input leads for connection with the power source and output leads for connection with the lamp to supply the output of the apparatus to the lamp, said circuit means including means to provide a path for the supply of energy from said energy storage element to said lamp when said switching means is driven to one state and to provide a path for the supply of energy from the power source to the lamp and for the storage of energy in said storage element when said switching means is driven to the other state whereby the said switching action controls the operation of the lamp and energy is supplied to the lamp during both states of said switching means.

2. The apparatus set forth in claim 1 wherein the energy storage element is an inductive element.

3. An apparatus for operating an electric discharge lamp from a power source comprising an inductive element, a switching means, a driver means for repetitively driving said switching means to a low impedance state and a high impedance state, circuit means including input leads for connection with the power source and output leads for connection with the lamp to supply the output of the apparatus to the lamp, a feedback means responsive to the lamp operating condition coupled with said driver means and activating said driver means in response to a feedback signal, said circuit means connecting said inductive element in circuit with said switching means to provide a path for the supply of energy from said inductive element for operation of the lamp when said switching means is driven to one of said switching states to cut off the power source from the electric discharge lamp, said circuit means providing a path for the supply of energy from the power source for operation of the lamp and for the storage of energy in the inductive element when said switching means is driven to the other of said switching states, whereby the switching action as controlled by said feedback means provides the ballasting required to maintain and control the electric discharge in the lamp.

4. An apparatus for operating an electric discharge lamp from a power source comprising a semiconductor switching means, a driver means coupled with said semiconductor switching means and causing said switching means to be activated to a high impedance state in response to a predetermined increase in energy supplied to the lamp and to a low impedance state in response to a predetermined decrease in the energy supplied to the lamp, an energy storage means, circuit means including electrical leads for connection in circuit with the power source to energize the apparatus and including output leads for connection in circuit with the lamp to apply the output of the apparatus to the lamp, said circuit means connecting said semiconductor switching means and said storage element in circuit to provide a path for an excursion of energy from the power source to the lamp and for storage in said storage means when said switching means is activated to one of said states and to provide a path for an excursion of energy from said storage element to the lamp when said switching means is activated to the other of said states, thereby to control the operation of the electric discharge lamp by the switching means and supply energy to the electric discharge lamp during said high and low impedance states of the semiconductor means.

5. The apparatus set forth in claim 4 wherein the energy storage element is an inductive element.

6. An apparatus for operating an electric discharge lamp from a power source comprising a transistor, a driver means coupled with said transistor and causing said transistor to be activated to a high impedance state and a low impedance state, a feedback means responsive to the lamp operating condition coupled with said driver means to activate said driver means in response to a feedback signal, at least one energy storage element, circuit means including electrical leads for connection in circuit with the power source to energize the apparatus and including output leads for connection in circuit with the lamp to apply the output of the apparatus to the lamp, said circuit means connecting said transistor and said energy storage element in circuit to provide a path for an excursion of energy from the power source to the lamp and for storage in said storage means when said transistor is activated to one of said states and to provide a path for an excursion of energy from said storage element to the lamp when said transistor is activated to the other of said states, said switching action of said transistor controlling the operation of the electric discharge lamp.

7. An apparatus for operating an electric discharge lamp from a power source comprising an energy storage element, a switching means, a driver means coupled with said switching means to repetitively switch said switching means to a low impedance and a high impedance state, circuit means including leads for connection with the power source and output leads for connection with the lamp, said circuit means connecting said switching means and said storage element in circuit to provide a path for an excursion of energy from said source for operation of said lamp and to said energy storage element to store energy therein when said switching means is driven to one of said states and to provide a path for an excursion of energy from said storage element for operation of the lamp when said switching means is driven to the other of said states and blocks the supply of energy from the power source to the lamp, said excursions of energy from said power source and said storage element being controlled by the repetitive switching action of said switching means to maintain the electric discharge of the lamp.

8. The apparatus set forth in claim 7 wherein the energy storage element is a capacitor.

9. The apparatus set forth in claim 7 wherein a feedback means is coupled with said driver means to regulate the switching action of said switching means.

10. An apparatus for operating an electric discharge lamp from a power source comprising a pair of input leads for connecting the power source in circuit with the apparatus, a switching means connected in circuit with one of the input leads, said switching means when in a low impedance state connecting the power source in circuit with the apparatus and when in a high impedance state disconnecting the power source from the apparatus, a driver means coupled with said switching means and repetitively switching said switching means to a high and low impedance state, an energy storage element, a diode means and a circuit means including output leads brought out externally of the apparatus for connection in circuit with the lamp and electrical leads connecting said storage element, said diode means and switching means in circuit to provide a path for an excursion of energy from said energy storage element to the lamp when said switching means is in the high impedance state and to provide a path for an excursion of energy from the power source to the lamp and to the storage element when the switching means is switched to the low impedance state, whereby the switching action of said switching means controls the operation of the electric discharge lamp with an overall step-down of the voltage of the power source.

11. The apparatus set forth in claim 10 wherein the storage element is an inductive element.

12. An apparatus for operating an electric discharge lamp from a power source comprising a pair of input leads for connecting the power source in circuit with the apparatus, a semiconductor switching means connected in circuit with one of the input leads, said semiconductor switching means when in a low impedance state connecting the power source in circuit with the apparatus and when in a high impedance state disconnecting the power source from the apparatus, a driver means coupled with said switching means and repetitively switching said switching means to a low and high impedance state, a feedback means responsive to the lamp operating condition coupled with said driver means to activate said driver means in response to a feedback signal, an energy storage element, a diode means, and a circuit means including input leads for connection in circuit with the power source and including electrical leads connecting said storage element, said diode means and switching means in circuit to provide a path for an excursion of energy from said energy storage element to the lamp when said switching means is in the high impedance state and blocks the supply of energy from the power source to the lamp, said circuit means also providing a path for an excursion of energy from the power source for operation of the lamp and to the storage element when the switching means is switched to the low impedance state, the switching action of said switching means controlling the operation of the electric discharge lamp with an over-all step-down in the voltage of the power source.

13. An apparatus for operating an electric discharge lamp from a power source having a given potential, said apparatus comprising a first energy storage element, a switching means, a switch driver means coupled with said switching means and repetitively driving said switching means to a high and low impedance state, a second energy storage element, circuit means including input leads for connection with the power source and output leads for connection with the lamp to apply the output of the apparatus to the lamp, said circuit means connecting said first and second energy storage elements in circuit with said switching means, said circuit means providing a path for the storage of energy from the power source in said first energy storage element when said switching means is in a low impedance state, with said path shunting said lamp, said circuit means also providing a path when said switching means is in a low impedance state for the supply of energy from said second energy storage element to the lamp, said circuit means further providing a path for the supply of energy from the power source to said second storage element and to the lamp when said switching means is in a high impedance state, the potential across said first storage element being in additive relationship with the potential of the power source when said switching means is switched to said high impedance state and said combined potential being applied across the output leads, the switching action of said switching means thereby controlling the operation of the electric discharge lamp.

14. The apparatus set forth in claim 13 wherein said first storage element is an inductive element and said second storage element is a capacitor.

15. The apparatus as set forth in claim 13 wherein an impedance element is connected in the discharge path of said second storage element to control the discharge of energy therefrom to said lamp.

16. The apparatus set forth in claim 13 wherein a diode means is connected in circuit with said second energy storage element to prevent the energy discharged therefrom from returning through said switching means or the power source when said switching means is in the closed position.

17. An apparatus for operating an electric discharge lamp from a power source comprising a first energy storage element, a semiconductor switching means, a switch driver means coupled with switching means and repetitively driving said semiconductor switching means to a high and a low impedance state, a feedback means responsive to the lamp operating condition to control said driver means to operate said switching means between said positions in accord with the lamp operating condition, a second energy storage element, a circuit means including input leads for connection with the power source and output leads for connection with the lamp to apply the output of the apparatus to the lamp, said circuit means connecting said first and second energy storage element in circuit with said semiconductor switching means to provide a path for the supply of energy from the power source for storing energy in said first storage element and a path for the supply of energy from said second storage element to the lamp when said semiconductor switching means is in a low impedance state, said circuit means providing a path for the supply of energy from the power source to said second storage element and to the lamp for operation thereof when said semiconductor switching means is in a high impedance state, the potential across said first storage element being in additive relationship with the potential of the power source when said switching means is switched to said high impedance state and said combined potential being applied across the output leads, the switching action of said switching means thereby controlling the operation of the electric discharge lamp.

18. An apparatus for operating an electric discharge lamp from an alternating current supply comprising an energy storage element, a bidirectional switching means, a driver means coupled with said bidirectional switching means for repetitively driving said switching means to a high and low impedance state during each half cycle of the alternating current supply, circuit means including input leads for connection with the alternating current supply and output leads for connection with the lamp, said circuit means connecting said bidirectional switching means and said energy storage element in circuit with said output and input leads to provide a path for an excursion of energy from said supply to said storage element and to the lamp when said switching means is repetitively driven to the one of said states in each half cycle and to provide a path for an excursion of energy from the storage element to the lamp when the said switching means is repetitively driven to the other of said states in each half cycle thereby to supply energy to the lamp continuously during both states of said switching means, the switching action of said switching means controlling the operation of the lamp in each half cycle of the alternating current supply.

19. An apparatus as set forth in claim 18 wherein the energy storage element is an inductive element.

20. An apparatus for operating an electric discharge lamp from an alternating current source comprising an energy storage element, a bidirectional switching means, a driver means coupled with said bidirectional switching means for repetitively driving said switching means to a high and a low impedance state during each half cycle of the alternating current source, a feedback means responsive to the lamp operating condition coupled with said driving means and controlling said driving means in response to a feedback signal, circuit means including leads for connection with the alternating current source and output leads for connection with the lamps, said circuit means connecting said bidirectional switch and energy storage element in circuit with said output and input leads to provide a path for the supply of energy from said storage element to said lamp when said switching means is driven to one of said states and to provide a path for a supply of energy from the power source to the lamp and for the storage of energy in said storage element when said switching means is driven to the other of said states in each half cycle, whereby the switching action of said switching means controls the operation of the electric discharge lamp in each half cycle of the alternating current supply.

21. An apparatus for operating an electric discharge lamp from an alternating current source having a given potential comprising a first energy storage element, a second energy storage element, a bidirectional switching means, a driver means coupled with said switching means and repetitively switching said switching means from a high impedance to a low impedance state in each half cycle of the alternating current source, circuit means including input leads for connection with the alternating current source and output leads for connection with the lamp to apply the output of the apparatus to the lamp, said circuit means connecting said bidirectional switching means and said first and second energy storage elements in circuit with said input and output leads, said circuit means providing a path for storing energy from the alternating current source in said first energy storage element and for shunting the lamp when said bidirectional switch is repetitively switched to the low impedance state in each half cycle, said circuit means concurrently providing a path for an excursion of energy from said second energy storage element to the lamp, said circuit means also providing a path for energy from the source to the lamp and for storage in said second storage element in each half cycle when the bidirectional switch is repetitively switched to a high impedance state in each half cycle, the potential across said first storage element being in additive relation with the potential across said source and the combined potential of the source and the storage element being supplied to the lamp when the bidirectional switch is in the high impedance state the switching action of said bidirectional switching means controllng the operaton of the lamp in each half cycle of the alternating current source.

22. The apparatus as set forth in claim 21 wherein said first storage element is an inductive element and said second storage element is a capacitor.

23. An apparatus for operating an electric discharge lamp from an alternating current source comprising a first energy storage element, a second energy storage element, a semiconductor switching means, a driver means coupled with said semiconductor switching means and repetitively switching said switching means to a high and a low impedance state in each half cycle of the alternating current source, a feedback means responsive to the lamp operating condition coupled with said driver means and controlling said driver means in response to a feedback signal, circuit means including input leads for connection with the alternating current source and output leads for connection with the lamp to apply the output of the apparatus to the lamp, said circuit means connecting said semiconductor switching means and said first and second energy storage elements in circuit with said input and output leads to provide a path for the supply of energy from the source to said first energy storage element for storage therein and for the supply of energy from said second ductor switching means is repetitively switched to one of energy storage element to the lamp when said semiconsaid states in each half cycle, said circuit means providing a path for the supply of energy from the source to the lamp and for storage in said second storage element in each half cycle when the semiconductor switching means is repetitively switched to the other of said state in each half cycle, the switching action of said semiconductor switching means thereby effecting a step-up of the voltage across the lamp and controlling the operation of the lamp in each half cycle of the alternating current source.

24. An apparatus for supplying operating potential from a source to a fluorescent lamp, said apparatus comprising means responsive to a predetermined increase in current in said lamp to interrupt the supply of operating potential from said source to the lamp, said means being responsive to a predetermined decrease in current through the lamp to restore said supply of operating potential from said source to the lamp, energy storage means, and means to store energy in said storage means during supply of operating potential from said source to the lamp and to discharge said stored energy through the lamp during interruption in said supply of operating potential from said source thereby to maintain operation of said lamp during said interruptions.

References Cited by the Examiner
UNITED STATES PATENTS

| | | | |
|---|---|---|---|
| 2,435,572 | 2/1948 | Bixby | 328—209 |
| 2,480,681 | 8/1949 | Stiefel | 315—241 |
| 2,995,709 | 8/1961 | Beardwood et al. | 328—223 X |
| 3,153,732 | 10/1964 | Mortley et al. | 328—223 |
| 3,165,668 | 1/1965 | Harley | 315—224 X |

JOHN W. HUCKERT, *Primary Examiner.*

ARTHUR GAUSS, *Examiner.*

L. ZALMAN, R. F. POLISSACK, *Assistant Examiners.*